(12) United States Patent
Maruyama

(10) Patent No.: US 9,104,470 B2
(45) Date of Patent: *Aug. 11, 2015

(54) TASK PROCESSOR

(71) Applicant: Kernelon Silicon Inc., Fujisawa-Shi (JP)

(72) Inventor: Naotaka Maruyama, Fujisawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,801

(22) Filed: Apr. 2, 2014

(65) Prior Publication Data

US 2014/0215488 A1    Jul. 31, 2014

Related U.S. Application Data

(63) Continuation of application No. 13/682,633, filed on Nov. 20, 2012, now Pat. No. 8,776,079, which is a continuation of application No. 12/304,769, filed as application No. PCT/JP2007/000880 on Aug. 16, 2007, now Pat. No. 8,341,641.

(51) Int. Cl.
*G06F 9/46* (2006.01)
*G06F 9/48* (2006.01)
*G06F 9/50* (2006.01)

(52) U.S. Cl.
CPC ............... *G06F 9/461* (2013.01); *G06F 9/462* (2013.01); *G06F 9/4843* (2013.01); *G06F 9/50* (2013.01)

(58) Field of Classification Search
CPC combination set(s) only.
See application file for complete search history.

(56) References Cited

U.S. PATENT DOCUMENTS

| 5,276,886 | A | * | 1/1994 | Dror ............................ 710/240 |
| 5,890,010 | A | * | 3/1999 | Nishigami ...................... 712/34 |
| 6,128,672 | A | * | 10/2000 | Lindsley ......................... 710/19 |
| 6,260,150 | B1 | | 7/2001 | Diepstraten et al. |
| 6,360,243 | B1 | * | 3/2002 | Lindsley et al. .............. 718/103 |
| 6,430,593 | B1 | * | 8/2002 | Lindsley ...................... 718/103 |
| 6,981,133 | B1 | | 12/2005 | Donovan |

(Continued)

FOREIGN PATENT DOCUMENTS

| JP | 11-272480 | 10/1999 |
| JP | 2001-075820 | 3/2001 |
| JP | 2003-271399 | 9/2003 |

OTHER PUBLICATIONS

Birrell, A.D. etal., Implementing Remote Procedure Calls, 1984, ACM, ACM Transactions on Computer systems vol. 2, No. 1. pp. 39-59.*

Itabashi et al., Mitsuyoshi, "Implementation Real-Time Operation System by Hardware and Evaluation." Technical Report of IEICE, Japan, IEICE, Dec. 17, 1993, vol. 93, No. 392, pp. 97-104.

(Continued)

*Primary Examiner* — Eric Coleman
(74) *Attorney, Agent, or Firm* — Muncy, Geissler, Olds & Lowe, P.C.

(57) ABSTRACT

A task processor includes a CPU, a save circuit, and a task control circuit. A task control circuit is provided with a task selection circuit and state storage units associated with respective tasks. When executing a predetermined system call instruction, the CPU notifies the task control circuit accordingly. When informed of the execution of a system call instruction, the task control circuit selects a task to be subsequently executed in accordance with an output from the selection circuit. When an interrupt circuit receives a high-speed interrupt request signal, the task switching circuit controls the state transition of a task by executing an interrupt handling instruction designated by the interrupt circuit.

13 Claims, 25 Drawing Sheets

(56) References Cited

U.S. PATENT DOCUMENTS

| | | |
|---|---|---|
| 7,234,139 B1 | 6/2007 | Feinberg |
| 7,334,142 B2 * | 2/2008 | Hack .............................. 713/320 |
| 7,386,707 B2 | 6/2008 | Kurata et al. |
| 7,472,237 B1 * | 12/2008 | Herbst et al. ................... 711/152 |
| 8,276,156 B2 | 9/2012 | Hayashi |
| 8,341,641 B2 | 12/2012 | Maruyama |
| 2002/0161957 A1 | 10/2002 | Comeau et al. |
| 2003/0115491 A1 * | 6/2003 | Williams et al. .............. 713/300 |
| 2004/0055003 A1 | 3/2004 | Sundaram et al. |
| 2005/0132376 A1 | 6/2005 | Rodgers et al. |
| 2006/0010305 A1 * | 1/2006 | Maeda et al. ................... 712/34 |
| 2006/0117316 A1 | 6/2006 | Cismas et al. |
| 2013/0081055 A1 | 3/2013 | Maruyama |

OTHER PUBLICATIONS

Mori et al., Hisanao, "Hardware implementation of a Real-Time Operating System for Embedded Control Systems," Aug. 2005. pp. 55-58.

PCT Application No. PCT/JP2007/000880 International Search Report and Written Opinion dated Nov. 14, 2007.

Japanese Patent Application No. 2008-521140; Office Action dated Jul. 13, 2009 (with English Translation).

Japanese Patent Application No. 2008-521140; Office Action dated Feb. 17, 2009 (with English Translation).

Japanese Patent Application No. 2008-521140; Office Action dated Sep. 16, 2008 (with English Translation).

U.S. Appl. No. 12/304,769, Office Action mailed Jan. 6, 2012.

\* cited by examiner

TASK PROCESSOR

CROSS-REFERENCE TO RELATED APPLICATIONS

The present application is a continuation and claims the priority benefit of U.S. application Ser. No. 13/682,633 filed Nov. 20, 2012, which is a continuation and claims the priority benefit of U.S. application Ser. No. 12/304,769 filed Mar. 17, 2009, now U.S. Pat. No. 8,341,641, which is a national phase application and claims the priority benefit of Patent Cooperation Treaty application number PCT/JP2007/000880, the disclosures of which are incorporated herein by reference.

BACKGROUND OF THE INVENTION

1. Field of the Invention

The present invention relates to the function of an operating system and, more particularly, to an interrupt process.

2. Description of the Related Art

Operating systems for dedicated devices such as cell phones, as well as operating systems for general-purpose devices such as personal computers, are required to perform advanced functions on a growing scale. Particularly, an operating system capable of executing a plurality of tasks by a single central processing unit (CPU) (hereinafter, an OS of this type will be referred to as a multi-task OS) is now built in a large number of electronic devices.

A multi-task OS divides the processing time of a CPU into units of time (time slices) and assigns time slices to a plurality of tasks. Each task is allowed to use the CPU only while being assigned a time slice from the OS. A single task can be executed in a given time slice. Since a time slice is a very short period of time, it looks to a user as if the plurality of tasks is being executed at the same time. According to such a method of processing, the processing power of the CPU is effectively used by giving the right for execution to task B when task A reaches a state to wait for an input and thus no longer needs the computing power of the CPU. The term "right for execution" is synonymous with the right to use the CPU.

Transfer of the right for execution by the multi-task OS will be referred to as a task switch. A task switch occurs when a time slice expires or when a task executes a predetermined instruction. A multi-task OS saves context information of a task being executed in a task control block (TCB) when a task switch is to be executed. Context information is data related to data stored in a register of the CPU while the task is being executed or data related to the state of execution. A TCB is an area reserved in a memory to store information unique to a task. A multi-task OS saves context information of a task being executed in a TCB, then selects a task to give the right for execution to, reads context information from the TCB for the selected task, and loads the information into a CPU register. In this way, each task continues its process step by step in units of time slices.

While a multi-task OS has the advantage of being capable of executing a plurality of tasks efficiently, it also involves a disadvantage of incurring the overhead associated with saving and loading context information. Normally, the advantage of a multi-task OS far surpasses the overhead associated with a task switch.

Recently, real-time operating systems with severe requirements for completion of a process within a predefined period of time are being used extensively especially in embedded systems. In an RTOS with severe time requirements, overhead incurred in a task switch may affect the performance of the system as a whole significantly.

An RTOS should instantly respond to various external factors that occur on an irregular base such as completion of DMA transfer, reception of a communication packet, or depression of a key of the keyboard. Normally, when an interrupt request signal indicating the occurrence of an external factor is received, the RTOS executes an "interrupt process" by activating a special task. For improvement of the performance of the RTOS, reduction of the overhead at the time of responding to an external factor is particularly important.

SUMMARY OF THE PRESENTLY CLAIMED INVENTION

In this background, a general purpose of the present invention is to provide a technology adapted for multi-tasking whereby execution of tasks can be controlled more efficiently than in the related art, and, more particularly, to a technology for increasing the speed of an interrupt process.

One aspect of the present invention relates to a task processor. The processor comprises: a processing register; an execution control circuit operative to load data from a memory into the processing register and to execute the task according to the data in the processing register; a state register operative to hold state data for each task; a task switching circuit operative to control a state of execution of a task; a task selecting circuit operative to select a task according to a predetermined condition for selection; and an interrupt circuit operative to process an interrupt request signal from an external source. When a first task executes a system call instruction, the execution control circuit notifies the task switching circuit accordingly. The task selecting circuit selects a task for execution from among tasks in a READY state indicating that the task is executable and waits for execution. The task switching circuit switches between tasks for execution by selecting a second task to be executed next in accordance with an output from the task selecting circuit occurring when the system call instruction is executed, saving the data in the processing register in a predetermined storage area, updating the state data in the state register associated with the first task, loading data associated with the second task and formerly saved in the storage area into the processing register, and updating the state data associated with the second task from READY to RUN. Upon receipt of an interrupt request signal, the interrupt circuit transmits an interrupt handling instruction associated with the interrupt request signal to the task switching circuit. The task switching circuit responds to the interrupt request signal by updating the state data of the task in accordance with the interrupt handling instruction.

The data loaded into the processing register may include: an instruction and an operand; an instruction without an operand; or simple data such as a program counter or a stack pointer. According to the inventive method of processing, the task switching circuit is capable of performing a task switch based on an output from the task selection circuit because the state register manages the status of a task. When an interrupt request signal is received from an external source, the task switching circuit updates the data in the state register in accordance with the interrupt handling instruction associated with the interrupt request signal. Thus, an interrupt request signal is dealt with at a high speed on a hardware level.

Optional combinations of the aforementioned constituting elements, and implementations of the invention in the form of methods, systems, recording mediums, and computer programs may also be practiced as additional modes of the present invention.

According to embodiments of the presently disclosed invention, the execution of tasks can be controlled more efficiently in multi-tasking.

DETAILED DESCRIPTION

Disclosed herein is the efficient control of task execution using multi-tasking.

A task processor 100 according to an embodiment of the present invention implements the task scheduling function of a multi-task OS by an electronic circuit and, further, improves the processing efficiency of the multi-task OS by implementing an interrupt process algorithm by hardware logic. The task processor 100 according to the embodiment implementing task scheduling of a multi-task OS by an electronic circuit will be described first as a "basic implementation". A method for further increasing the speed by implementing the interrupt process algorithm will be described as an "improved implementation". Hereinafter, the term "the embodiment" will basically refer to both the "basic implementation" and the "improved implementation".

Basic Implementation

A task processor 100 according to an embodiment of the present invention implements the task scheduling function of a multi-task OS by an electronic circuit. Before describing the details of the task processor 100, a description will be given of state transition of a task with reference to FIG. 1. The description hereunder is directed to state transition of a task in a commonly used multi-task OS. However, the illustration is equally applicable to state transition of a task in the task processor 100. An overview of a system call executed in the task processor 100 will also be given. The design concept of a commonly used multi-task OS will be described with reference to FIGS. 2 and 3 and the method of processing in the task processor 100 according to the basic implementation will be described in detail with reference to FIGS. 4 through 10. The features of the task processor 100 in connection with processes related to semaphores, mutexes, and events will also be discussed by comparing the inventive features with the technology commonly used.

State Transition of a Task

Figure 1:
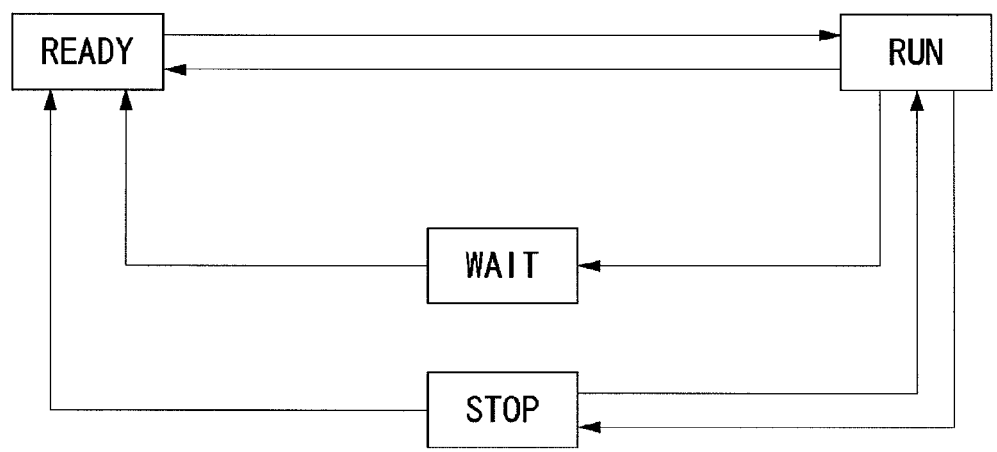
FIG. 1 is a state transition diagram of a task.

FIG. 1 is a state transition diagram of a task. In a multi-task process, each task has a state. Each task makes a transition between a plurality of states and is in a certain state at any given point of time. A state transition is triggered by execution of a system call or detection of an interrupt request signal. A system call is a special instruction among the instructions executed by a task. An interrupt request signal occurs when certain data is received from a peripheral device (e.g., in the event of depression of a key of the keyboard, a mouse click, or reception of data communicated from elsewhere). A state transition also occurs when a time slice assigned to a task has been consumed.

Tasks are categorized into ordinary tasks and special tasks. Ordinary tasks are non-special tasks executed in response to a system call. Special tasks are tasks executed in response to detection of an interrupt request signal. Special tasks are alternatively referred to as interrupt handlers. The states that a task can assume will be described first and then a description will be given of various system call instructions.

(1) STOP State (Sleep State)

In the STOP state, a task remains inactive. Both ordinary tasks and special tasks can assume the STOP state. Hereinafter, tasks in the STOP state will be referred to as STOP-tasks.

1-1. Ordinary Tasks

When a task executes a system call directing activation of another task (hereinafter, referred to as an activation system call), an ordinary task in the STOP state makes a transition to the READY state.

1-2. Special Tasks

A special task is normally in the STOP state. When a task switching circuit 210 detects an interrupt request signal, a special task makes a transition from the STOP state to the RUN state. The task formerly in the RUN state makes a transition to the READY state.

(2) RUN State (Execution State) [0052] In the RUN state, a task is being executed. In other words, a task has been assigned a time slice and has acquired the right to use the CPU. Both ordinary tasks and special tasks can assume the RUN state. Hereafter, tasks in the RUN state will be referred to as RUN-tasks. Of a plurality of tasks, only one can assume the RUN state. No two tasks can assume the RUN state concurrently.

2-1. Ordinary Tasks

Upon executing a predetermined system call, an ordinary task in the RUN state makes a transition from the RUN state to the READY state or the WAIT state. Transition to the READY state also occurs when a task in the RUN state has consumed a time slice. Whichever is the case, an ordinary task formerly in the READY state makes a transition to the RUN state in place of the task formerly in the RUN state. Upon detection of an interrupt request signal, the RUN-task makes a transition to the READY state. In this process, a special task formerly in the STOP state makes a transition to the RUN state. When the RUN-task executes a system call (hereinafter, referred to as a termination system call) for terminating the execution of itself, the RUN-task makes a transition to the STOP state.

2-2. Special Tasks

A special task, upon making a transition from the STOP state to the RUN state in response to an interrupt request signal, returns to the STOP state upon completion of its process. A special task may only assume the STOP state and the RUN state.

(3) READY State (Executable State) [0056] In the READY state, a task can be executed. A task in the READY state is ready to make a transition to the RUN state once given an authority for execution from the OS. Only ordinary tasks can assume the READY state. Hereinafter, tasks that are in the READY state will be referred to as READY-tasks.

When an ordinary task formerly in the RUN state makes a transition to a state other than the RUN state as a result of the execution of a system call, or when a special task in the RUN state makes a transition to the STOP state upon completion of its process, a READY-task makes a transition to the RUN state to take the place of the task formerly in the RUN state. Ordinary tasks make a transition to the RUN state only from the READY state. When there are a plurality of tasks in the READY state, one of the READY-tasks makes a transition to the RUN state based upon the task order priority, which forms context information. When there are a plurality of READY-tasks assigned the same task priority order, the task with the oldest history of transition to the READY state makes a transition to the RUN state.

(4) WAIT State (Standby State)

In the WAIT state, a task waits for the fulfillment of a WAIT cancellation condition. When the WAIT cancellation condition is fulfilled, the task in the WAIT state makes a transition to the READY state. Only ordinary tasks can assume the WAIT state. Hereinafter, tasks that are in the WAIT state will be referred to as WAIT-tasks. The WAIT cancellation condition will be described in detail later.

To summarize, tasks can continue their process using the CPU only when the task is in the RUN state. An RTOS manages the state of a plurality of tasks to switch between RUN-tasks as appropriate. This will allow the CPU to execute at least one of the tasks at any given point of time.

System Call

An additional description will be given of a system call. System calls are largely categorized into three types: calls related activation; calls related to WAIT; and calls related to SET.

(1) System Calls Related to Activation

System calls related to activation are calls related to transition between the STOP state and the READY state.

1-1. Activation System Call

An activation system call is a call whereby task A, a RUN-task, activates another ordinary task B. In the event of an activation system call, task B in the STOP state makes a transition to the READY state.

1-2. Termination System Call

The task that has executed this system call terminates its process and makes a transition from the RUN state to the STOP state. A termination system call may be an instruction whereby a given task causes another task to terminate its process.

(2) System Calls Related to WAIT

System calls related to WAIT are calls related to transition between the RUN state and the WAIT state.

2-1. Wait Semaphore System Call

A system call that requires acquisition of a semaphore.

2-2. Wait Mutex System Call

A system call that requires acquisition of a mutex.

2-3. Wait Event System Call

A system call that waits for the establishment of an event. For execution, a wait event system call accepts an event ID, a wait flag pattern, and a flag condition as parameters. Whichever is the case, system calls related to WAIT establish various WAIT cancellation conditions. When the WAIT cancellation condition is already fulfilled when a system call related to WAIT is executed, the RUN-task that has executed the system call makes a transition to the READY state. Meanwhile, when the WAIT cancellation condition is not fulfilled, the RUN-task makes a transition to the WAIT state in which the task waits for the fulfillment of the WAIT cancellation condition.

(3) System Calls Related to SET

System calls related to SET are calls related to transition between the WAIT state and the READY state. Execution of a system call related to SET triggers the establishment of the WAIT cancellation condition.

3-1. Release Semaphore System Call (or "Signaling Semaphore System Call")

A system call that releases a semaphore.

3-2. Release Mutex System Call

A system call that releases a mutex.

3-3. Set Event System Call (or "Set Flag System Call")

A system call that establishes a current flag pattern of an event.

3-4. Clear Flag System Call

A system call that clears the current flag pattern to zero.

The description of the basic implementation assumes the use of the nine types of system calls listed above. It goes without saying, however, that various other system calls can be implemented. For example, there may be implemented a "release wait system call" that causes a WAIT-task to make a transition to the READY state unconditionally or a "wake up task system call" that causes a task in the WAIT state due to a sleep command to make a transition to the READY state.

Design Concept of Commonly Used RTOS

Figure 2:
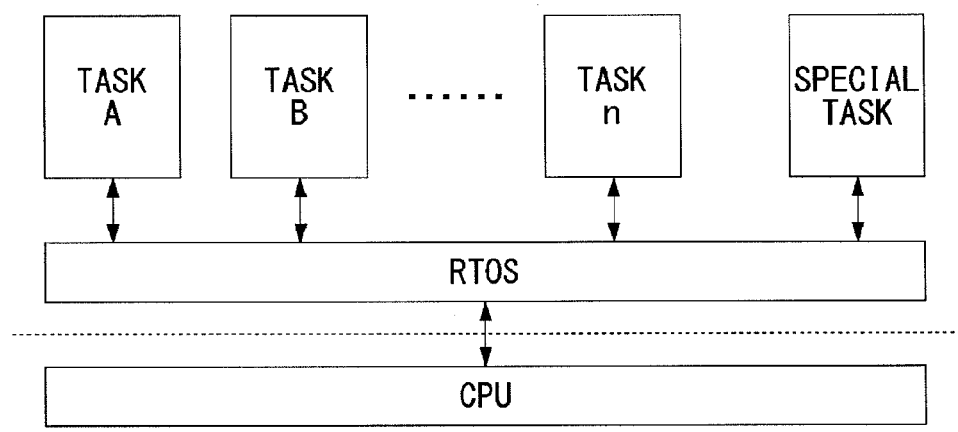
FIG. 2 is a conceptual diagram of a commonly used RTOS.

FIG. 2 is a conceptual diagram of a commonly used RTOS.

The illustrated RTOS is a multi-task OS. A commonly used RTOS is implemented as software. Switching of a RUN-task from task A to task B will be described by way of example. Since task A is occupying the CPU, the RTOS generates an interrupt to the CPU so as to seize the right to use the CPU from task A. Thereupon, the RTOS saves the context information of task A in a TCB. The RTOS selects task B as the next RUN-task and loads the context information from the TCB for task B into a register of the CPU. When the load is complete, the RTOS delivers the right to use the CPU to task B. In this way, the RTOS performs a task switch from task A to task B by temporarily acquiring the right to use the CPU.

The same is true of the execution of special tasks. As in the case of ordinary tasks, the RTOS achieves a task switch by saving the context information of a RUN-task in a TCB before delivering the right to use the CPU to a special task. Since the RTOS is implemented by software, the RTOS needs the right to use the CPU in order to execute its process. In other words, the RTOS and the tasks contend with each other in respect of the right to use the CPU. Hereinafter, an RTOS implemented by software will be referred to as a software OS.

Figure 3:
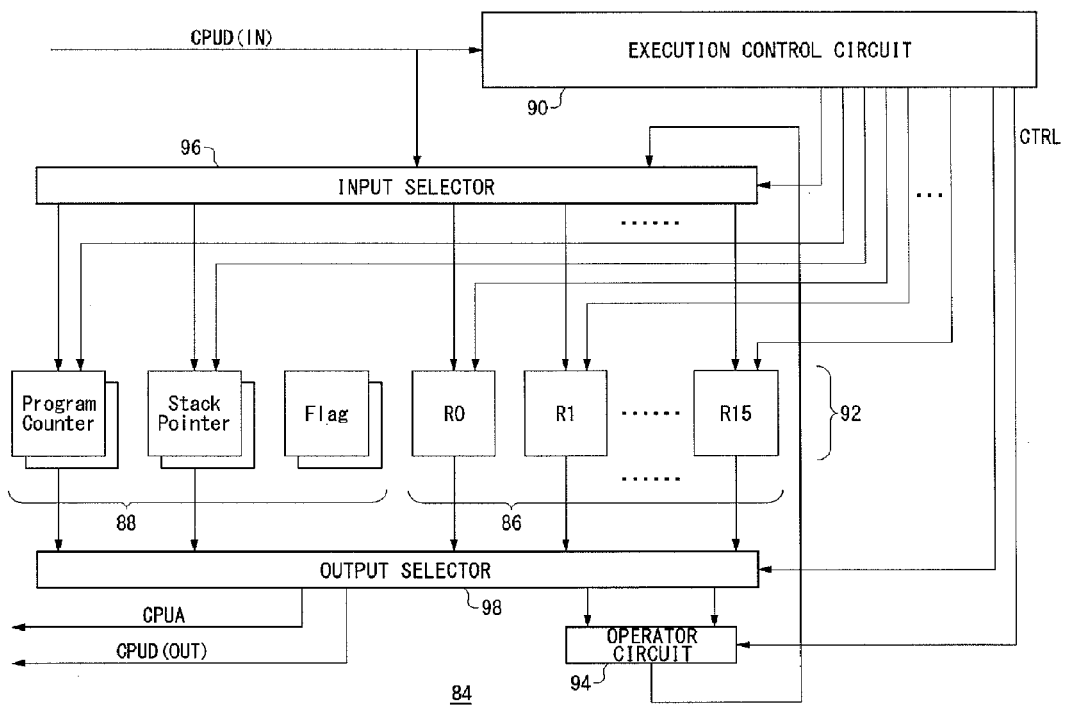
FIG. 3 is a circuit diagram of a commonly used CPU in which a software RTOS is executed.

FIG. 3 is a circuit diagram of a commonly used CPU in which a software RTOS is executed. A CPU 84 includes an execution control circuit 90 for controlling memory access, instruction execution, etc. in an integrated manner, and a processing register set 92 for storing various data such as context information of tasks, and an operator circuit 94 for arithmetic operation. The processing register set 92 is a set of a plurality of types of registers and is largely categorized into special registers 88 and general-purpose registers 86. Special registers 88 are registers for storing a program counter, a stack pointer, and a flag, etc. General-purpose registers 86 are registers for storing work data and include a total of 16 registers R0-R15. While the special registers 88 are put to both the user's use and the system's use (dual planes), the general-purpose registers 86 is only put to a single use (single plane). Hereinafter, data stored in the processing register set 92 will be referred to as process data.

The execution control circuit 90 uses a control signal (CTRL) directed to an output selector 98 to output the process data in a desired register, of the processing register set 92, to the operator circuit 94. The operator circuit 94 performs an arithmetic operation by referring to the process data, i.e., instructions and variables. The result of operation is output to an input selector 96. The execution control circuit 90 uses a control signal (CTRL) directed to the input selector 96 to feed a result of operation to a desired register of the processing register set 92.

The execution control circuit 90 also reads data from a memory via the CPU bus and loads the data into the processing register set 92 via the input selector 96. Further, the execution control circuit 90 records the process data in the memory via the CPU data bus. The execution control circuit 90 executes a task, while updating the program counter in the special registers 88.

In the event of a task switch, the execution control 90 saves process data in a TCB, an area reserved in the memory. It will be assumed that task A executes a system call and a task switch from task A to task B occurs. The RTOS acquires the right to use the CPU, triggered by the execution of a system call. This causes the CPU 84 to be temporarily operated in accordance with the program of the RTOS. The processing steps are as follows.

Saving of Context Information of Task A

The execution control circuit 90 performs switching so as to put the special registers 88 to the system's use instead of the user's use. Process data subject to the RTOS process is loaded into the special registers 88 put to the system's use. The execution control circuit 90 saves the data in the general-purpose registers 86 in a stack (not shown). The execution control circuit 90 loads the process data for the RTOS from a recording medium (not shown) (e.g., another register) into the general purpose registers 86. At this stage, the process data in the process register set 92 is completely replaced by the process data for the RTOS. The RTOS identifies the TCB for task A in the memory and writes the process data saved in the stack in the TCB. The process data in the special registers 88 put to the user's use is also written in the TCB as part of the context information. In this way, the process data for task A is saved in the TCB. The RTOS indicates in the TCB for task A that task A has made a transition from RUN to READY (or WAIT).

Loading of Context Information of Task B

The RTOS identifies the TCB for task B in the memory and writes the context information in the TCB in the stack and in the special registers 88 put to the user's use. The RTOS indicates in the TCB for task B that task B has made a transition from the READY to the RUN. The RTOS removes the data for the RTOS process from the general-purpose registers 86 and saves the same in a recording medium (not shown). The execution control circuit 90 loads the context information in the stack into the general-purpose registers 86. The execution control circuit 90 performs switching so as to put the special registers 88 to the user's use instead of the system's use. In this way, the process data for task B is loaded into the process register set 92.

A task switch is achieved through the processing steps as described above. Normally, each of the general purpose registers 86 comprises a single plane and as such uses a stack in order to switch between the process data for a task and the process data for the RTOS. If the general-purpose registers 86 are provided with two planes, there will be no need to save and load data via a stack. This will allow a task switch to take place at a higher speed.

The basic implementation achieves even faster task switching by providing save registers 110 for respective tasks. A task switch using the save registers 110 will be described in detail with reference to FIG. 5. It will be learned that, in the case of the CPU 84 and the commonly used software RTOS described with reference to FIG. 3, accesses to the TCB occurs frequently for a task switch. An assumption in the example described above is that a task switch from task A to task B occurs. In practice, however, a large number of instructions should be executed in order for the RTOS to select task B. This process also involves frequent accesses from the RTOS to the memory. The task processor 100 according to the basic implementation enables faster task switching by using a task control circuit 200 dedicated to task selection. The task processor 100 according to the basic implementation enables faster task switching by using a task control circuit 200 dedicated to task selection.

Hardware Implementation of RTOS by the Task Processor

Figure 4:
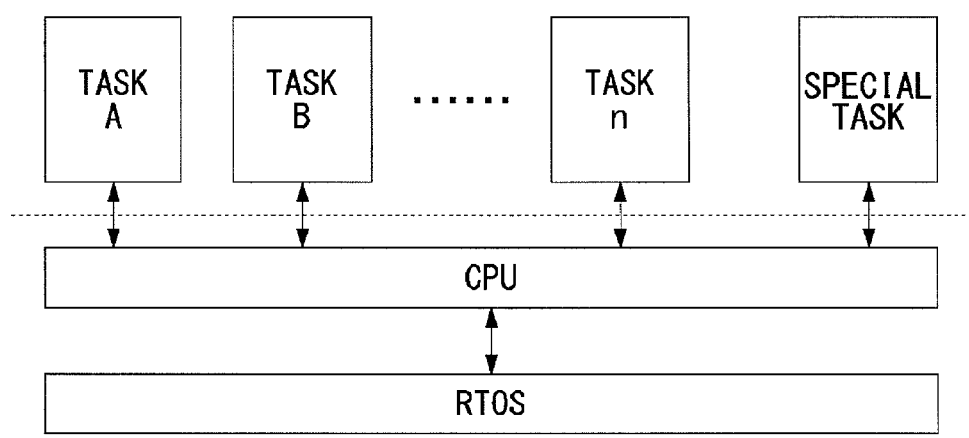
FIG. 4 is a conceptual diagram of the RTOS according to a basic implementation.

FIG. 4 is a conceptual diagram of the RTOS according to the basic implementation. Unlike a commonly used software RTOS, the RTOS according to the basic implementation is primarily implemented by hardware separate from the CPU. Hereinafter, the RTOS implemented by hardware will be referred to as hardware RTOS. Since the RTOS according to the basic implementation is primarily configured as hardware separate from the CPU, it hardly needs the right to use the CPU for its processing. In other words, the RTOS and the task do not contend with each other in respect of the right to use the CPU. In the case of the commonly used software RTOS shown in FIG. 2, the CPU serves as a task execution circuit and an RTOS execution circuit. In contrast, in the case of the hardware RTOS according to the basic implementation, the CPU is clearly defined as a task execution circuit. The task scheduling function is primarily implemented by a save circuit 120 and the task control circuit 200.

Figure 5:
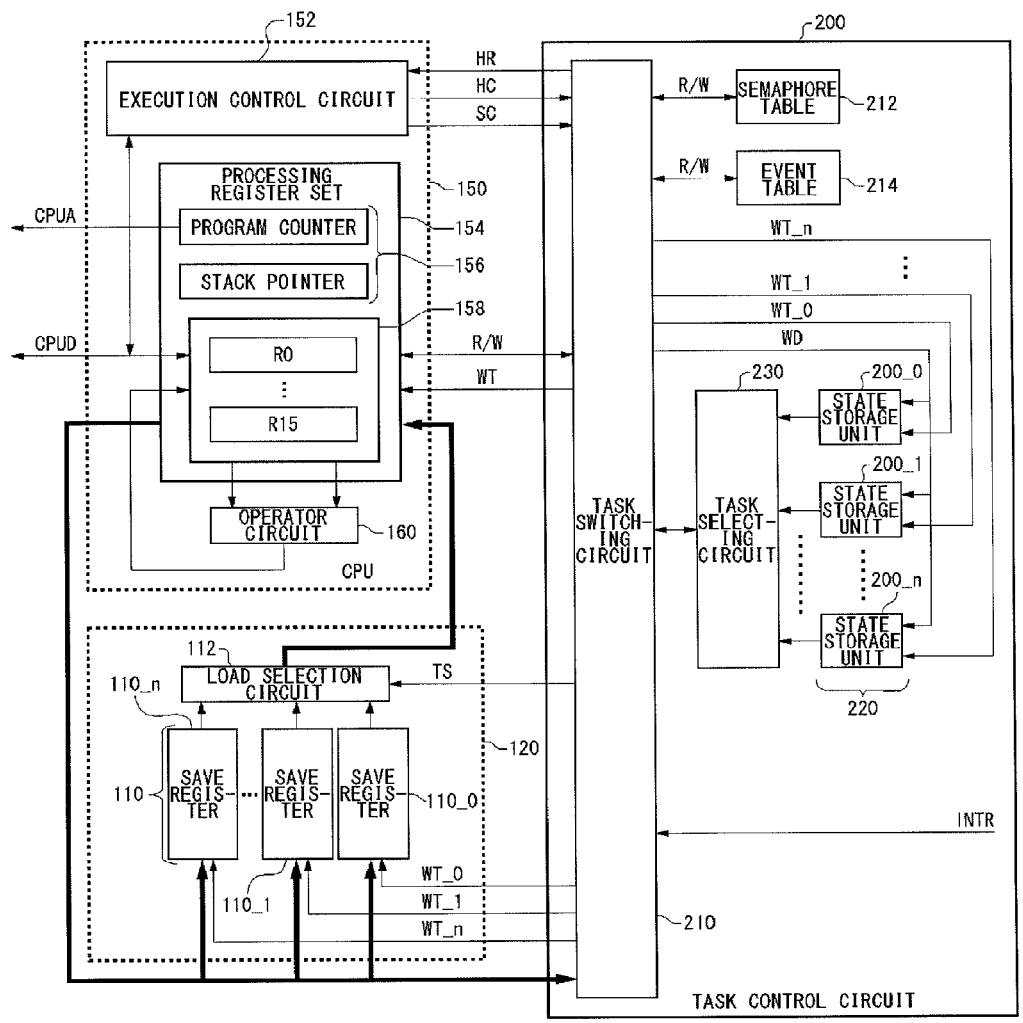
FIG. 5 is a circuit diagram of the task processor according to the basic implementation.

FIG. 5 is a circuit diagram of the task processor 100 according to the basic implementation. The task processor 100 includes the save circuit 120 and the task control circuit 200 in addition to a CPU 150. The CPU 150 is an entity responsible for the execution of a task. The save circuit 120 and the task control circuit 200 are responsible for playing the role of the RTOS shown in FIG. 4. Task scheduling is performed primarily under the control of the task control circuit 200.

The CPU 150 includes an execution control circuit 152, a processing register set 154, and an operator circuit 160. The CPU 150 may be an ordinary CPU as described with reference to FIG. 3. The difference is that signal lines in the CPU 150 according to the basic implementation are connected in a manner different from those of the CPU 84 shown in FIG. 3. The specific circuit configuration will be described in detail with reference to FIG. 6.

The task control circuit 200 includes a task switching circuit 210, a semaphore table 212, an event table 214, a task selecting circuit 230, and state storage units 220. The semaphore table 212 and the event table 214 will be described in detail with reference to FIG. 13 and subsequent drawings. The state storage units 220 are units associated with respective tasks. Hereinafter, a state storage unit 220 associated with task A is denoted as a state storage unit 220_A. The same is true of the other units 220. Each state storage unit 220 stores state data of the associated task. State data represents information indicating the attributes (e.g., task priority order, task state, etc.) of a task and forming a part of context information. The specific details of the data are described with reference to FIG. 10. The state storage units 220 continuously output the state data of the tasks to the task selecting circuit 230. The task selecting circuit 230 selects a task (e.g., a RUN-task) on the basis of the state data of the tasks. The task selecting circuit 230 will be described in detail with reference to FIG. 10 and subsequent drawings. The task switching circuit 210 performs a task switch when detecting a system call signal (SC) received from the execution control circuit 152 or an interrupt request signal (INTR) from an external device and thereupon.

When a system call is to be executed, the execution control circuit 152 transmits a system call signal (SC) to the task switching circuit 210. When the task switching circuit 210 receives an interrupt request signal (INTR) from an interrupt controller (not shown), the task switching circuit 210 asserts a halt request signal (HR) sent to the execution control circuit 152. While the operation of the CPU 150 is halted, the execution control circuit 152 asserts a halt completion signal (HC) sent to the task switching circuit 210. These three signals allow the CPU 150 and the task control circuit 200 to be operated in coordination.

The save circuit 120 includes a load selection circuit 112 and a plurality of save registers 110. The save registers 110 are also units associated with the respective tasks and are used to save process data in the processing register set 154. Therefore, the save registers 110 have a data capacity equal to or greater than that of the processing register set 154. Hereinafter, the save register 110 associated with task A is denoted as a save register 110_A. The same is true of the other registers 110. The load selection circuit 112 is directed by the task switching circuit 210 to load the data in one of the save registers 110 (hereinafter, the data stored in the save register 110 will be referred to as saved data) into the processing register set 154.

Each save register 110 continuously outputs the respective saved data to the load selection circuit 112. When the task switching circuit 210 feeds a task selecting signal (TS) designating a task ID, the load selection circuit 112 outputs the saved data in the save register 110 associated with the designated task to the processing register set 154. Further, when the task switching circuit 210 feeds a write signal (WT) to the processing register set 154, the saved data is actually loaded into the processing register set 154.

Meanwhile, the entirety process data in the processing register set 154 is also continuously output to the save registers 110. When the task switching circuit 210 asserts a write signal (WT) sent to the desired save register 110, the processing data is saved in the save register 110. The number of bits transferable in one sitting by the bus connecting the processing register set 154 and the save registers 110 is defined so as to enable parallel transfer of process data. Therefore, the task switching circuit 210 is capable of writing process data in the save registers 110 in one sitting merely by transmitting a write signal once to the save registers 110. The number of bits of the bus connecting the save registers 110 and the load selection circuit 112 and the bus connecting the load selection circuit 112 and the CPU 150 are also defined similarly. The methods of performing a task switch in response to a system call and in response to an interrupt request signal are now described.

[1] Execution of System Call

When the execution control circuit 152 of the CPU 15 executes a system call, the execution control circuit 152 halts the clock of the CPU 150 (hereinafter, referred to as CPU clock (CLK)). The specific method of halting will be described in detail with reference to FIG. 7, etc. The execution control circuit 152 transmits a system call signal (SC) indicating the execution of a system call to the task switching circuit 210 of the task control circuit 200. When the halt of the CLK is completed, the execution control circuit 152 asserts a halt completion signal (HC) sent to the task switching circuit 210.

Nine signal lines connect the CPU 150 and the task switching circuit 210 for transfer of system call signals. The nine signal lines are associated with the nine types of system calls described before. The execution control circuit 152 transfers a digital pulse via one of the system signal lines in accordance with the type of system call executed. The task switching circuit 210 is immediately capable of detecting the type of system call executed by the identifying the system signal lines on which the digital pulse is detected. The task switching circuit 210 selects necessary data from the data output from the task selecting circuit 230 in accordance with the type of system call and executes the process designated by the system call. The process is executed on the condition that HC is asserted. The relation between the task switching circuit 210 and the task selecting circuit 230 will be described in detail with reference to FIG. 10. The parameter and return value of the system call are written in predetermined general-purpose registers 158 of the processing register set 154. The task switching circuit 210 is capable of reading the parameter from the general-purpose registers 158 and writing the return value in the registers 158. It will be assumed here that task A, a RUN-task, executes a wait semaphore system call. The process data for task A need be saved first.

Saving of Context Information of Task A

The execution control circuit 152 feeds a SC signal indicating a wait semaphore system call to the task switching circuit 210. The execution control circuit 152 halts CLK and asserts HC when the halt is completed. The task switching circuit 210 outputs the semaphore ID of the semaphore to be waited for to a semaphore-based selection circuit 234, which forms the individual selecting circuits built in the task selecting circuit 230, and the selects task B to be executed next. The task switching circuit 210 writes necessary data in the state storage unit 220_A. For example, the circuit 210 updates the state of task A, switching from RUN to READY or WAIT. More specifically, the task switching circuit 210 outputs state data indicating the task state WAIT to all of the state storage units 220 and thereupon feeds a write signal WT_A only to the state storage unit 220_A. In this way, the state of task A is updated.

Subsequently, the task switching circuit 210 outputs a write signal (WT) to the save register 110_A. Since the process data in the processing register set 154 is continuously output to the save registers 110, the write signal (WT) causes the process data for task A to be saved in the save register 110_A for task A.

Loading of Context Information of Task B

When the updating of the state data of task A and saving of the process data for task A are completed, the task switching circuit 210 outputs a task selecting signal (TS_B) designating task B to the load selection circuit 112. This causes the saved data in the save register 110_B to be output to the processing register set 154. When the task switching circuit 210 outputs a write signal (WT) to the processing register set 154, the saved data for task B is loaded into the processing register set 154. The task switching circuit 210 also writes necessary data in the state storage unit 220 for task B. For example, the circuit 210 updates the state of task B, switching from READY to RUN. When the above process is completed, the execution control circuit 152 resumes the CPU clock. The CPU 15 starts executing task B according to the resumed CPU clock. The further details of the processing method will be described with reference to FIG. 8B.

[2] Generation of Interrupt Request Signal

The task switching circuit 210 detects an interrupt request signal (INTR) from a peripheral device. More specifically, the interrupt request signal (INTR) is transmitted from an interrupt controller (not shown) to the task switching circuit 210. The parameter indicating the level of the interrupt request signal is recorded in a register built in the interrupt controller. The task switching circuit 210 asserts a halt request signal (HR) sent to the execution control circuit 152, whereupon the execution control circuit 152 halts the CPU clock. As in the process initiated by the execution of a system call, the task switching circuit 210 saves the process data for the RUN-task in the save register 110. Subsequently, the task switching circuit 210 activates a special task. Only one type of special task is available for activation irrespective of the parameter of the interrupt request signal. The special task reads the parameter of INTR from the register built in the interrupt controller and performs a process according to the parameter. The process performed by the special task may be the execution of a set event system call or a semaphore system call, or the process may be the activation of an ordinary task. Depending on the parameter, the special task may be terminated without executing any specific process. What process is executed according to the parameter of INTR depends on the implementation of the special task. When the execution of the special task is completed, the next RUN-task is selected from among the READY-tasks.

The task switching circuit 210 loads the process data in the save register 110 associated with the special task into the CPU 150. Time required to switch from an ordinary task to a special task can be estimated from the operation clock of the task control circuit 200. When a predetermined number of operation clocks is counted since HR is asserted and sent to the execution control circuit 152, the task switching circuit 210 negates HR in order to cancel the halt of the CPU clock. When HR is negated, the execution control circuit 152 resumes the CPU clock. At this point of time, the task switching circuit 210 has completed the task switch from an ordinary task to a special task. The specific details of the processing method are described with reference to FIG. 8A.

In either case, core processes involved in a task switch, i.e., (A) saving and loading of process data and (B) task state transition and selection of a RUN-task are implemented in hardware. Elimination of a need to access a TCB on the memory in (A) and (B) additionally contributes to increase of speed in a task switch. What is required in the CPU 150 of the task processor 100 is to additionally include the function of halting and resuming the CPU clock. The scope of embodiments of the present invention is not limited to the complete hardware implementation of these functions. For example, a skilled person would readily appreciate that the primary function of (A) or (B) may be implemented in hardware and a part of the function of the RTOS may be implemented in software in order to assist the hardware function.

Figure 6:
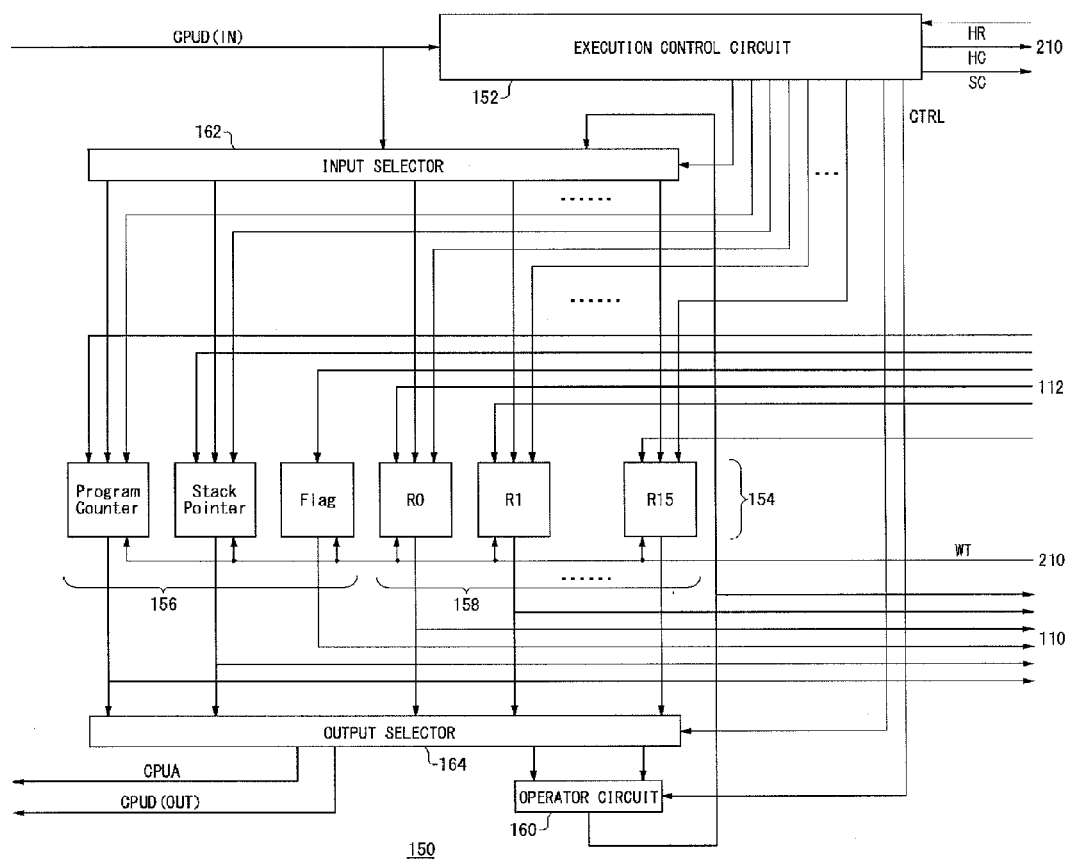
FIG. 6 is a circuit diagram of the CPU of FIG. 5.

FIG. 6 is a circuit diagram of the CPU 150 of FIG. 5. Unlike the CPU 84 of FIG. 3, the special registers 156 and the general-purpose registers 158 of the processing register set 154 are both of a single-plane configuration. Introduced in the processing register set 154 are an input bus from the load selection circuit 112, an output bus to the save registers 110, and a signal line for a write signal (WT) from the task switching circuit 210. The execution control circuit 152 uses a control signal (CTRL) directed to an output selector 164 to feed the data in a desired register, of the processing register set 92, to the operator circuit 160. The result of operation represents an input to the input selector 162. The execution control circuit 152 uses a control signal (CTRL) directed to the input selector 162 to feed the result of operation to a desired register of the processing register set 154. The execution control circuit 152 executes a task, while updating the program counter in the special registers 156.

The process data is not saved in the TCB on the memory but in the save registers 110. The processing register set 154 continuously outputs the process data to the save registers 110. The point of time at which the process data is saved in the save registers 110 is controlled by the task switching circuit 210 as described previously.

The saved data is loaded into the processing register set 154 not from the TCB on the memory but from the save registers 110. The determination of a save register 110 from which to load the process data and the timing of load are controlled by the task switching circuit 210 as described previously.

The number of bits transferable by the bus connecting the processing register set 154 and the load selection circuit 112 and the bus connecting the processing register set 154 and the save registers 110 are defined so as to enable parallel transfer of process data in one sitting. Thus, data can be read or written in one sitting in response to a write signal (WT) from the task switching circuit 210. An ordinary software RTOS need occupy the processing register set 154 temporarily for task switching. In contrast, the hardware RTOS according to the basic implementation need not load special process data into the processing register set 154 for a task switch. What is only required for task switch from task A to task B is to save the process data for task A and then load the process data for task B. Accordingly, there is no need to configure the processing register set 154 to comprise two planes or to swap data via a stack.

Figure 7:
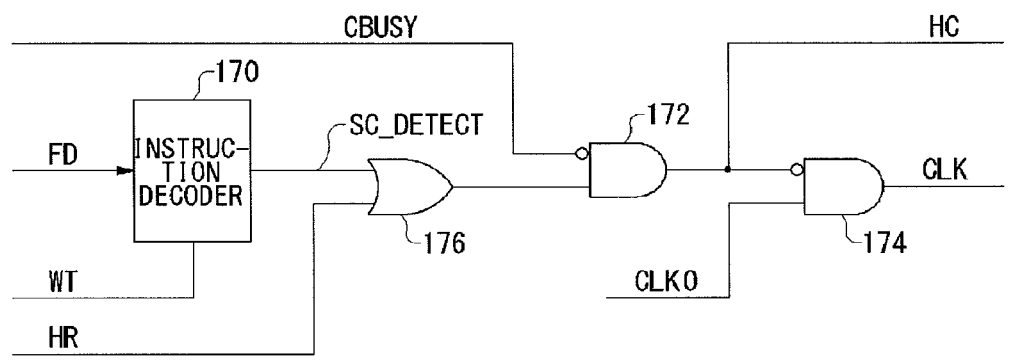
FIG. 7 is a circuit diagram showing how the execution control circuit halts the CPU clock.

FIG. 7 is a circuit diagram showing how the execution control circuit 152 halts the CPU clock. The original clock (CLK0) and the output of a first AND gate 172 are fed to a second AND gate 174. The output of the gate 172 is inverted before being provided to the gate 174. The output of the first AND gate 172 is a halt completion signal (HC). Since the halt completion signal (HC) is normally zero, the second AND gate 174 outputs the input original clock (CLK0) as the CPU clock (CLK) unmodified. The CPU 150 operates by receiving the CPU clock output by the second AND gate 174. When the output of the first AND gate 172 is 1, i.e., when the halt completion signal (HC)=1, the output of the second AND gate 174 is fixed at zero so that the CPU clock (CLK) is halted.

The output of an OR gate 176 and a CPU busy signal (CBUSY) are fed to the first AND gate 172. The CPU busy signal is inverted before being provided to the gate 172. CBUSY is a signal output from a known state machine that generates an internal cycle of the CPU 150. When the CPU 150 can be halted, CBUSY becomes 1. For example, when the operator circuit 94 has executed a single instruction or the last of a plurality of instructions being locked and the CPU can be halted accordingly, or when the supply of the CPU clock is already halted, CBUSY becomes 0.

The output of an instruction decoder 170 (SC_DETECT) and a halt request signal (HR) from the task switching circuit 210 are fed to the OR gate 176. The instruction decoder 170 has a built-in latch circuit for latching SC_DETECT. The instruction decoder 170 receives data (FD) fetched from the CPU 150. When FD is a system call instruction, the decoder 170 outputs SC_DETECT=1. The built-in latch circuit ensures that the instruction decoder 170 continues to output SC_DETECT=1 even if FD changes subsequently. A write signal (WT) sent from the task switching circuit 210 to the processing register set 154 is also fed to the instruction decoder 170. When WT changes from 0 to 1, the saved data is loaded into the processing register set 154, as described previously. WT is a pulse signal that returns from 1 to 0 after a predetermined period of time. When WT changes from 1 to 0, the latch circuit of the instruction decoder 170 is reset and the instruction decoder 170 negates SC_DETECT. The relation between SC_DETECT and the write signal (WT) will be described in detail with reference to FIG. 8B. The instruction decoder 170 according to the basic implementation is a device exclusively provided in the execution control circuit 152 in order to determine whether an instruction subject to execution is a system call. In a variation to the embodiment, the instruction decoder 170 and the CPU decoder responsible for the decoding stage of the CPU 150 may be implemented in the same hardware. In this case, the instruction decoder 170 can be implemented by adding to the CPU decoder the function of outputting SC_DETECT=1 when the decoded data is a system call instruction. When an interrupt request signal (INTR) occurs, the task switching circuit 210 asserts a halt request signal (HR) sent to the execution control circuit 152. In other words, the output of the OR gate 176 goes 1 when a system call is executed or when a halt request signal (HR) is asserted.

To summarize, when a system call is executed or an interrupt request signal occurs, and when the CPU busy signal goes 0, the output of the first AND gate 172 goes 1 and the second AND gate 174 discontinues outputting the CPU clock.

Figure 8A:
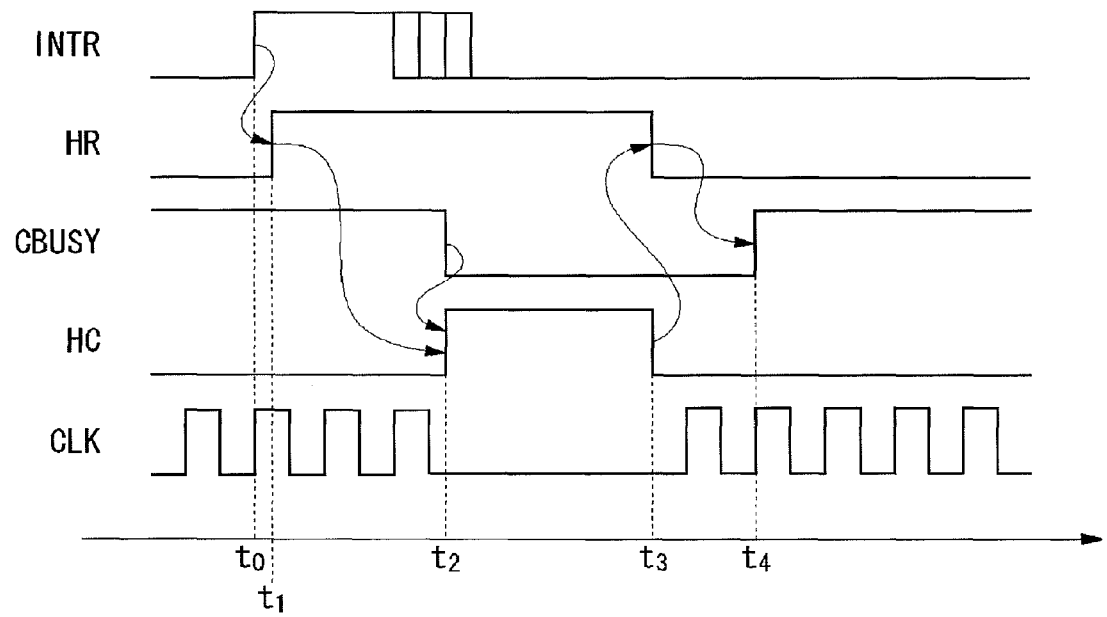
FIG. 8A is a time chart showing the relation between signals when an interrupt request signal occurs.

FIG. 8A is a time chart showing the relation between signals when an interrupt request signal occurs. Referring to FIG. 8A, the task switching circuit 210 detects an interrupt request signal (INTR) from an external device at time t0. The task switching circuit 210 asserts a halt request signal (HR) sent to the execution control circuit 152 in order to allow execution of a special task. Time t1, when the signal HR is input, substantially concurs with time t0 when the interrupt is detected. At time t1, the state machine of the CPU 150 indicates that a task is being executed so that CBUSY=1. Since HR=1, the OR gate 176 outputs 1. However, the CPU 150 is not halted since CBUSY=1. Therefore, even if HR=1 is fed, the CPU clock (CLK) in synchronization with the original clock (CLK0) is output for a time.

As time elapses, CBUSY goes 0 at time t2. Since HR=1 already, the first AND gate 172 outputs HC=1. The CPU clock output from the second AND gate 174 is fixed at 0. Meanwhile, the task switching circuit 210 initiates a task switch from an ordinary task to a special task, triggered by the assertion of HC. Time required for a task switch includes several clocks for operating the task control circuit 200. The task control circuit 200 negates the halt request signal (HR) on the condition that the operation clock for the task control circuit 200 changes a predetermined number of times (time t3) since the assertion of HC. Since HR=0, the execution control circuit 152 resumes the CPU clock (CLK). When the CPU 150 resumes its process, the CPU 150 changes CBUSY from 0 to 1 (time t4). Thus, in a period from time t2 to time t3, while the CPU clock is halted, a task switch from an ordinary task to a special task is performed. In an alternative method of processing, HR may be negated on the condition that the task switching circuit 200 has completed a task switch instead of on the condition that the operation clock for the task control circuit 200 changes a predetermined number of times. The execution control circuit 152 may negate HC on the condition that HR is negated. The execution control circuit 152 resumes the CPU clock (CLK) when HC=0. The execution of the task may be resumed accordingly.

Figure 8B:
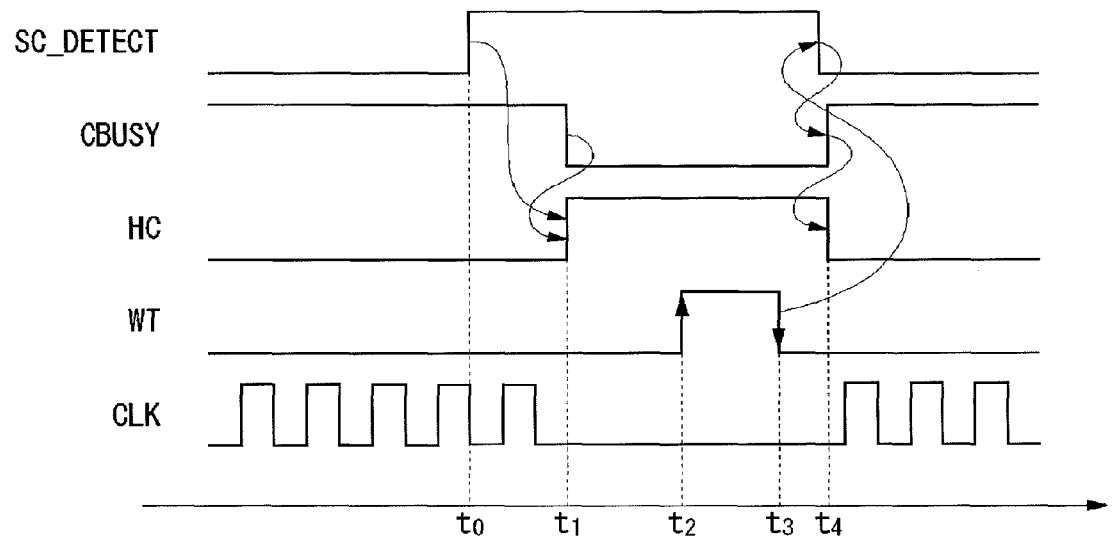
FIG. 8B is a time chart showing the relation between signals when a system call is executed.

FIG. 8B is a time chart showing the relation between signals when a system call is executed. Referring to FIG. 8B, the instruction decoder 170 detects a system call and changes SC_DETECT from 0 to 1 at time to. At time t0, the state machine of the CPU 150 indicates that the task is being executed so that CBUSY=1. Since SC_DETECT=1, the OR gate 176 outputs 1. However, since CBUSY=1, the CPU 150 is not halted. Therefore, even if SC_DETECT=1 is output, the CPU clock (CLK) in synchronization with the original clock (CLK0) is output for a time.

As time elapses, CBUSY goes 0 at time t1. Since SC_DETECT=1 and CBUSY=1, HC is negated and the CPU clock is halted. When HC=0 is fed, the task switching circuit 210 initiates a task switch and outputs a write signal (WT) to the CPU 150. At time t2, when WT goes from 0 to 1, the saved data is loaded into the processing register set 154. Since a write signal (WT) is a pulse signal, WT goes 0 at time t3 after an elapse of a predetermined time. Detection of a falling edge of WT (WT:1→0) causes SC_DETECT latched in the instruction decoder 170 to be reset (time t4). At this point of time, CBUSY changes from 0 to 1. Since CBUSY=1, HC=0 so that the CPU clock is resumed. Thus, in a period from time t1 to time t4, while the CPU clock is halted, a task switch is performed. In an alternative method of processing, HC may be negated on the condition that the task switching circuit 200 has completed a task switch and negated HR instead of on the condition that a falling edge of WT (WT:1→0) is detected. SC_DETECT is reset on the condition that HC=0. The execution control circuit 152 resumes the CPU clock (CLK) and CBUSY goes from 0 to 1.

In any case, the CPU 150 need not have knowledge that the RUN-task is switched while the CPU clock is halted. The task switching circuit 210 performs a task switch while the CPU clock is halted so that the CPU 150 is "frozen". Therefore, the process in the CPU 150 and the process in the task switching circuit 200 are isolated from each other in the sequence of events.

Figure 9:
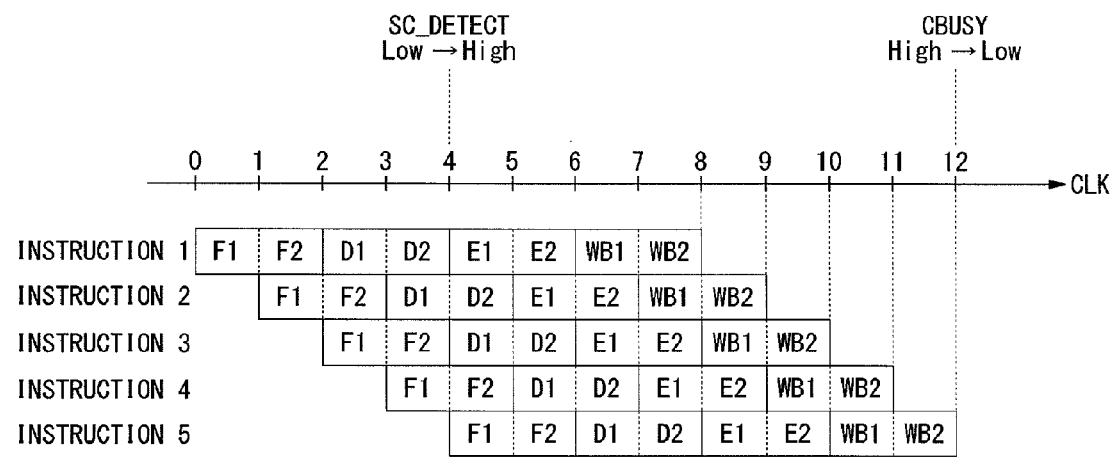
FIG. 9 schematically shows the timing of halting the CPU clock in a pipeline process.

FIG. 9 schematically shows the timing of halting the CPU clock in a pipeline process. The CPU 150 executes a task by executing a plurality of instructions, reading them sequentially from the memory into the processing register set 154. Execution of an instruction as a unit of execution of a task is decomposed into the following four phases.

1. F (fetch): the instruction is retrieved from the memory.
2. D (decode): the instruction is decoded.
3. E (execution): the instruction is executed.
4. WB (write back): the result of execution is written in the memory.

When a given task sequentially executes instructions 1 through 5, instruction 1 may be allowed to go through stages F through WB and then instruction 2 may be allowed to go through stage F. However, for efficient execution, the execution of instruction 2 is started during the execution of instruction 1 in a majority of cases. Such a method of processing is called pipeline processing. For example, when instruction 1 reaches phase D, phase F of instruction 2 is started. When instruction 1 reaches phase E, phase D of instruction 2 and phase F of instruction 3 are initiated. Thus, the execution time of each task can be reduced by increasing the number of instructions executed per unit time. Each phase may be further divided into two small phases. For example, phase F may be divided into two phases F1 an F2. When instruction 1 reaches phase F2, phase F1 of instruction 2 is started. When instruction 1 reaches phase D1, phase F2 of instruction 2 and phase F1 of instruction 3 are started. By segmenting a phase, the computing resources of the CPU 150 can be used more efficiently. Referring to FIG. 9, a description will be given of the timing of halting the CPU clock when a system call is generated in a pipeline process whereby each phase is segmented into two phases for execution.

Referring to FIG. 9, instruction 1 is started to be processed at time 0 defined by the CPU clock. At time 4 defined by the CPU clock, decoding of instruction 1 is completed. It will be assumed that instruction 1 is a system call. The instruction decoder 170 changes SC_DETECT from 0 to 1. SC_DETECT returns from 1 to 0 on the condition that the write signal from the task switching circuit 210 to the processing register set 154 changes from 1 to 0. Even if SC_DETECT=1 is output, CBUSY remains 1 since instructions 2 through 5 are already being executed. Therefore, the second AND gate 174 continues to output the CPU clock. Meanwhile, when SC_DETECT=1, the execution control circuit 152 suspends the update of the program counter so that no new instructions are fetched. Accordingly, instruction 6 and subsequent instructions are not fetched.

The execution of instruction 1 is completed at time 8 defined by the CPU clock, but instructions 2 through 5 are being executed. Therefore, the CPU busy signal remains 1. When time 12 defined by the CPU clock is reached, the execution of instruction 5 is completed. At this point of time, the CPU busy signal goes 0. The supply of the CPU clock is halted according to the process described with reference to FIG. 8B. The task switching circuit 210 saves the process data yielded upon completion of the execution of instruction 5 in the save registers 110. According to the method of halting as described above, a task switch can take place in such a manner that the result of execution of instructions subsequent to the execution of a system call is not wasted. When the task switch is completed, the CPU busy signal is set to 1 again and the instruction decoder 170 resumes its process. This resumes the supply of the CPU clock. In an alternative method of processing, the CPU busy signal may be set to 0 at a point of time when the execution of a system call instruction is completed so that the supply of the CPU clock is halted. In this case, instructions that are executed concurrently with the system call instruction are halted while being executed. The interim results of processing the suspended instructions are recorded in the processing register set 154 before being saved in the save registers 110. The execution of the suspended instructions is resumed when the task generating these instructions is turned into a RUN-task subsequently. For example, when an instruction is fetched and then suspended at that stage, instructions and operands read from the memory are saved in the save registers 110. When the task is resumed, the data in the save registers 110 is loaded into the processing register set 154 so that the decoding stage and the subsequent stages are executed.

Figure 10:
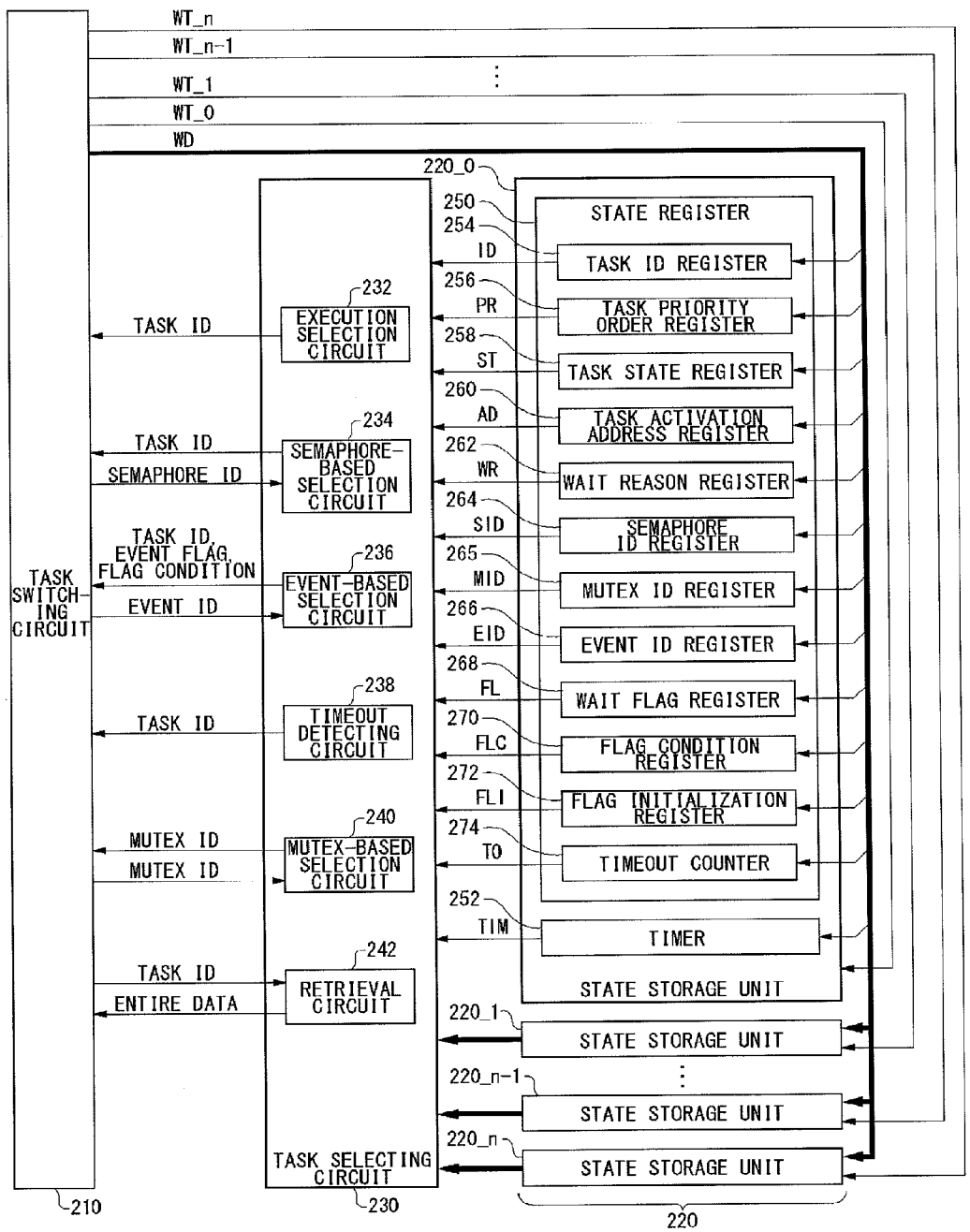
FIG. 10 is a circuit diagram showing the relation between the state storage units and the task switching circuit.

FIG. 10 is a circuit diagram showing the relation between the state storage unit 220 and the task switching circuit 210. The state storage unit 220 includes a state register 250 and a timer 252. The stage storage unit 220 stores the state data of a task. The timer 252 is started when a task makes a transition to the READY state or to the WAIT state. Time elapsed since the transition of a task to the READY state is referred to as elapsed READY time and time elapsed since the transition of a task to the WAIT state will be referred to as elapsed WAIT time. The timer 252 continuously outputs the value of the elapsed time as a TIM signal. When a task makes a transition to the READY state or to the WAIT state in a task switch, the task switching circuit 210 drives the timer 252 for the task so as to start measuring time.

The state storage unit 220 is a set of registers as described below. (A) Task ID register 254: a register for storing a task ID. The task ID register 254 continuously outputs an ID signal indicating a task ID to the task selecting circuit 230. Hereinafter, the ID signal output from the task ID register 254 for task A to the task selecting circuit 230 will be denoted as an ID_A signal. The same notation will be used for all the other signals output from the state storage unit 220. (B) Task priority order register 256: a register for storing a task priority order. The task priority order register 256 continuously outputs a PR signal indicating the priority order of a task. The larger the value, the higher the priority of the task, 0 denoting the highest priority. (C) Task state register 258: a register for storing a task state. The register 258 continuously outputs an ST signal indicating one of the STOP, RUN, WAIT, and IDLE states. An IDLE state occurs prior to the initialization of a task. (D) Task activation register 260: a register for storing the TCB address of a task in the memory. The register 260 outputs an AD signal. (E) Wait reason register 262: a register for storing the reason for wait while a task is in the WAIT state, the reason for wait forming a WAIT cancellation condition. The reasons for wait are as follows:

"in wait for a semaphore";
"in wait for an event"; and
"in wait for a mutex"

The register 262 outputs a WR signal. (F) Semaphore ID register 264: a register for storing the semaphore ID of a semaphore to wait for when a task is in the WAIT state for the reason that the task waits for a semaphore. The register 264 outputs an SID signal. (G) Mutex ID register 265: a register for storing the mutex ID of a mutex to wait for when a task is in the WAIT state for the reason that the task waits for a mutex. The register 264 outputs an MID signal. (H) Even ID register 266: a register for storing the event ID of an event to wait for when a task is in the WAIT state for the reason that the task waits for an event. The register 266 outputs an EID signal. (I) Wait flag register 268: a register for storing a wait flag pattern when a task is in the WAIT state for the reason that the task waits for an event. The register 268 outputs an FL signal. (J) Flag condition register 270: a register for storing a flag condition when a task is in the WAIT state for the reason that the task waits for an event. The register 270 outputs an FLC signal. A wait flag pattern and a flag condition will be described in detail later. (K) Flag initialization register 272: a register for storing data indicating whether or not a wait flag pattern is established. The register 272 outputs an FLI signal. (L) Timeout counter 274: a register for storing a timeout value. A timeout value is a variable designated in system calls related to WAIT. The task switching circuit 210 decrements the timeout value of the timeout counter 274 periodically. The counter 274 outputs a TO signal. Instead of allowing the task switching circuit 210 to decrement a timeout value, the timeout counter 274 may periodically decrement its timeout value autonomously.

The task selecting circuit 230 selects a task on the basis of the signals output from the state storage units 220. The task selecting circuit 230 include the following circuits. (A) Execution selection circuit 232: a circuit for selecting a next RUN-task to effect a task switch. The execution selection circuit 232 always selects one of the tasks on the basis of the state data continuously output from the state storage units 220. The execution selection circuit 232 receives four inputs ID, ST, PR, and TIM. The circuit outputs the task ID of the next RUN-task. The circuit configuration will be described in detail with reference to FIG. 12. (B) Semaphore-based selection circuit 234: a circuit for selecting the task to make a transition from the WAIT state to the READY state in response to the execution of a release semaphore system call. The circuit 234 receives the semaphore ID of the semaphore released by a release semaphore system call (hereinafter, simply referred to as a semaphore to be released) from the task switching circuit 210. The circuit 234 receives six inputs ID, ST, WR, PR, SID, and TIM from the state storage units 220. The output of the circuit 234 is the task ID of the task to make a transition from the WAIT state to the READY state. In the absence of the associated task, the circuit 234 outputs a predetermined value such as −1. The specific circuit configuration will be described in detail with reference to FIG. 13. (C) Event-based selection circuit 236: a circuit for selecting the task to make a transition from the WAIT state to the READY state in response to the execution of a set event system call. The circuit 236 receives the event ID of the event that is set by a set event system call (hereinafter, simply referred to as a set event) from the task switching circuit 210. The circuit 236 receives six inputs ID, ST, WR, EID, FL, and FLC from the state storage units 220. The output of the circuit 236 is the task ID of the task to make a transition from the WAIT state to the READY state and FL and FLC of the task. (D) Timeout detecting circuit 238: a circuit for detecting a task, among the tasks in the WAIT state, for which the timeout value of the timeout counter 274 reaches zero. The timeout detecting circuit 238 is driven each time the timeout value is updated. The circuit 238 receives three inputs ID, ST, and TO. The circuit 238 outputs the task ID of the associated task. In the absence of the associated task, the circuit 238 outputs a predetermined value such as −1. (E) Mutex circuit 240: a circuit for selecting the task to make a transition from the WAIT state to the READY state in response to the execution of a release mutex system call. The circuit 240 receives the mutex ID of the mutex released by a release mutex system call (hereinafter, simply referred to as a released mutex) from the task switching circuit 210. The circuit 240 receives six inputs ID, ST, WR, PR, SID, and TIM from the state storage units 220. The circuit 240 outputs the task ID of the task to make a transition from the WAIT state to the READY state. In the absence of the associated task, the circuit 240 outputs a predetermined value such as −1. (F) Retrieval circuit 242: a circuit that outputs the entire state data of a task when the task ID thereof is received from the task switching circuit 210.

Hereinafter, a task switch will be described, highlighting the process of the task selecting circuit 230 and discussing the selection of a RUN-task, semaphore, event, mutex, and timeout in comparison with the commonly used technology.

Selection of a RUN Task

[1] Selection of a RUN Task by a Commonly Used Software RTOS

Figure 11:
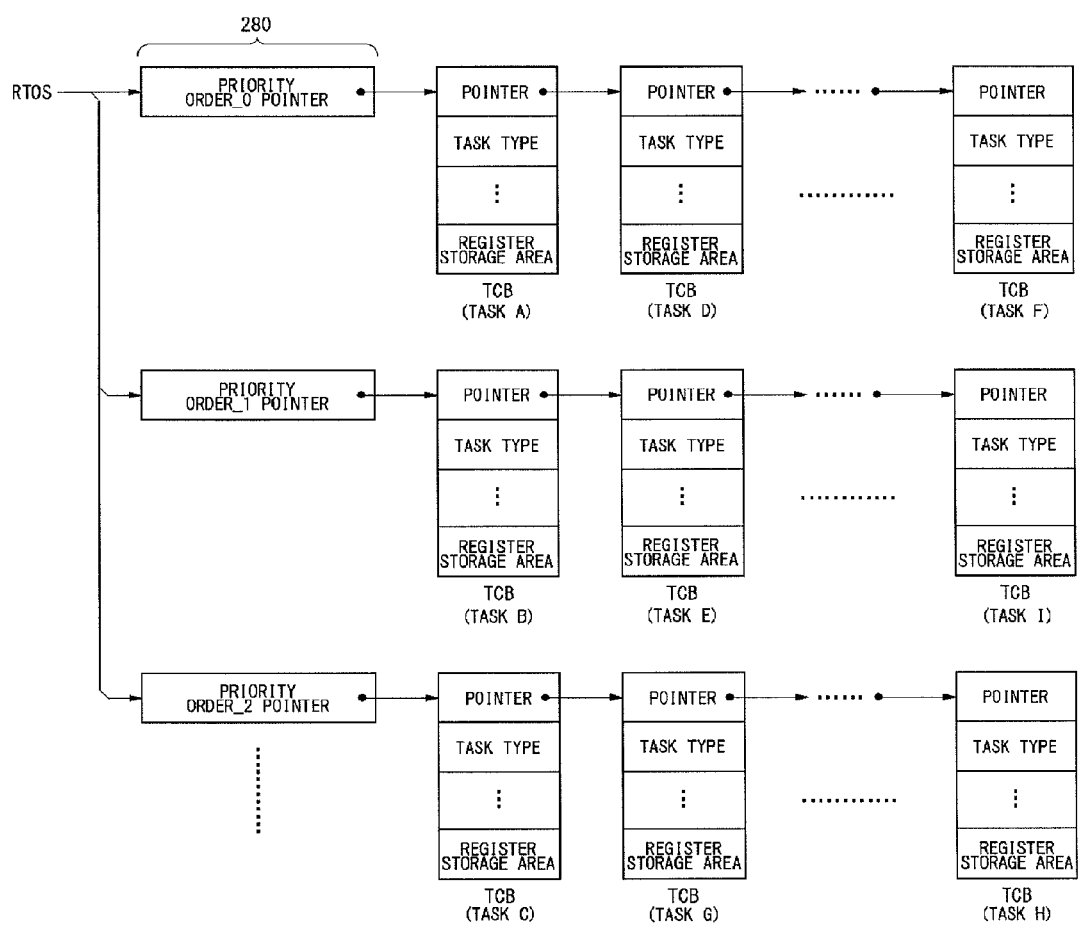
FIG. 11 shows a task ready list used by a commonly used RTOS to select a RUN-task.

FIG. 11 shows a task ready list used by a commonly used RTOS to select a RUN-task. A task ready list is formed on the memory, connecting the TCBs of the READY-tasks by pointers. Priority order pointers 280 are provided for respective task priority orders and indicate the start address of the TCB for the task having the associated task priority order. In the case of the task ready list of FIG. 11, the priority order pointer 280 of the task priority order 0 addresses the TCB for task A. The priority order pointer 280 of the task priority order 1 addresses the TCB for task B. The TCB for task A addresses the TCB for task D. A commonly used software RTOS scans the task ready list to select the next RUN-task. In this process, the RTOS performs the following two steps.

A. Cause a RUN-task to make a transition from RUN to READY.

B. Select the next RUN-task and causes the selected task to make a transition from READY to RUN.

The process performed by the software RTOS is decomposed into the following.

State Transition of a RUN Task

The description hereunder assumes that task J is the RUN-task.

A1. The RTOS stores the task ID of the RUN-task in the memory.

The RTOS acquires the address of the TCB for task J on the basis of the task ID.

A2. The RTOS accesses the TCB to acquire the task priority order of task J. It will be assumed that the task priority order is 0.

A3. The RTOS refers to the task ready list shown in FIG. 11 to acquire the priority order pointer 280 associated with the task priority order of task J.

A4. The RTOS detects the TCB indicated by the priority order pointer 280 thus acquired. In this case, the TCB for task A is detected.

A5. The RTOS follows the pointer leading from the TCB for task A so as to detect the TCB at the end of the list. FIG. 11 shows that task F is at the end of the list.

A6: The RTOS configures the pointer from the TCB for task F to address the TCB for task J. In this way, the TCB for task J is added to the task ready list.

A7. The RTOS indicates in the TCB for task J that task J is in the READY state. The process data is copied to the register storage area of the TCB.

State Transition of a READY-Task

B1. The RTOS detects whether the priority order pointer 280 of the task priority order 0 points to any TCB. In the absence of TCBs, RTOS detects whether the priority order pointer 280 of the task priority 1 points to any TCB. The RTOS attempts to identify a task until a TCB pointed to is found, while going through the list in the descending order of task priority. In the illustrated case, task A is identified.

B2. The RTOS removes task A from the task ready list. More specifically, the priority order pointer 280 of the task order 0 is rewritten so as to address the TCB for task D instead of task A. Further, the pointer of task A is configured to NULL so as not to address task D. In this way, the TCB for task A is removed from the task ready list.

B3. The RTOS indicates in the TCB for task A that task A is in the RUN state. Further, the process data saved in the register storage area of the TCB for task A is loaded into the processing register set.

A commonly used software RTOS performs a task switch by using the task ready list as described above. The following policies are observed when the RTOS selects a RUN-task from among a plurality of READY-tasks.

1. The task selected should be a READY-task (first condition).
2. The task selected should have the highest priority order among the READY-tasks (second condition).
3. If there are a plurality of tasks assigned the highest task priority order, the task selected should have the oldest history of going into the READY state (third condition).

These three conditions will be collectively referred to as a RUN-task selection condition. The execution control circuit 232 of the task processor 100 implements the RTOS's task scheduling function as described above in hardware.

Figure 12:
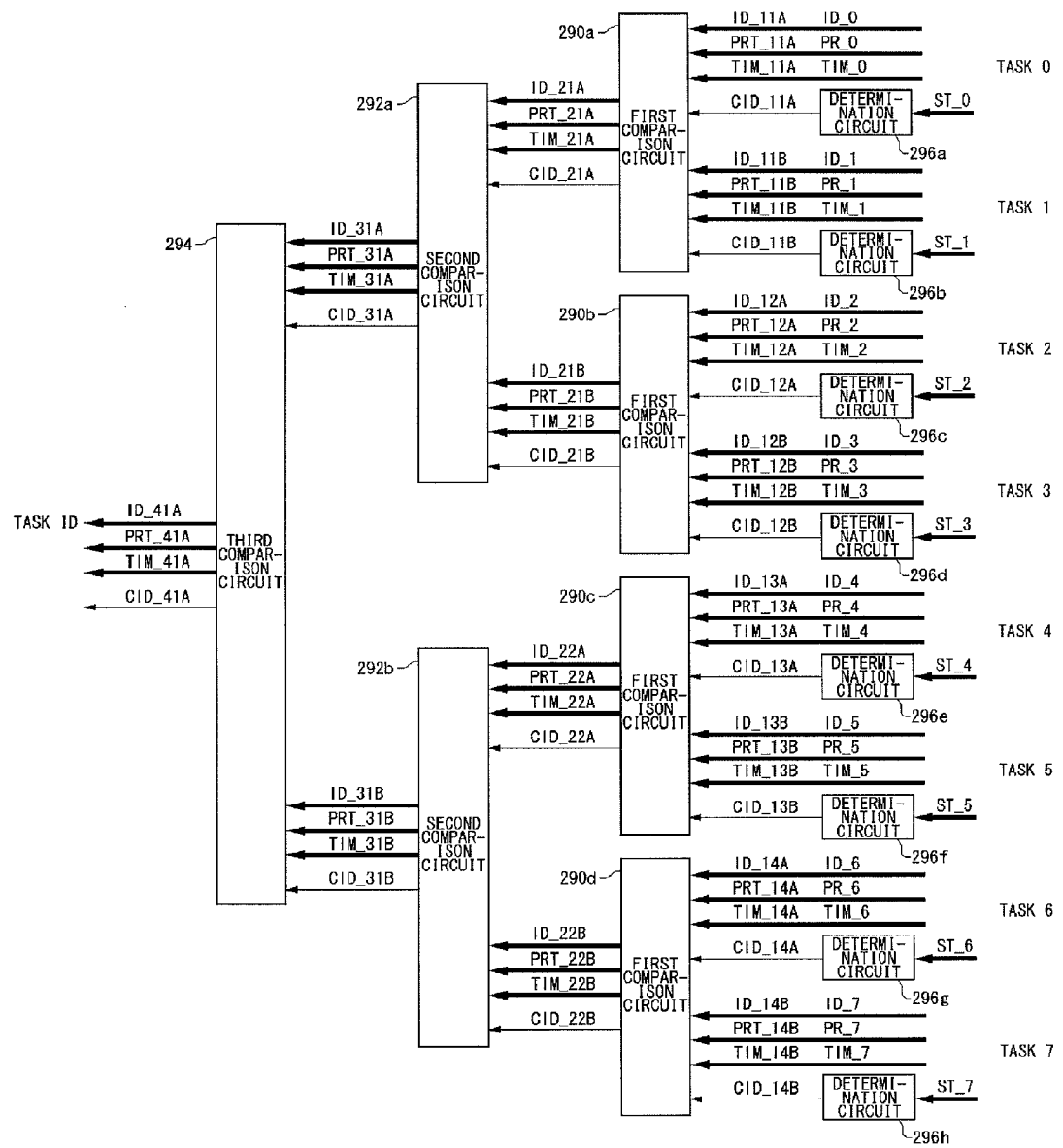
FIG. 12 is a circuit diagram of the execution selection circuit.

[2] Selection of a RUN Task by the Hardware RTOS According to the Basic Implementation FIG. 12 is a circuit diagram of the execution selection circuit 232. The description hereunder assumes that a RUN-task is selected from among eight tasks, namely task 0 through task 7. The execution selection circuit 232 includes four 1st comparison circuits 290 (290a-290d), two 2nd comparison circuits 292 (292a, 292b), and a 3rd comparison circuit 294. The circuit 232 also includes eight determination circuits 296 (296a-296h). Each of the determination circuits 296 receives an ST signal indicating the task state. When the signal indicates READY, the circuit 296 outputs a CID signal at 1. When the signal indicates a state other than READY, the circuit 296 outputs a CID signal at 0. The determination circuit 296 performs a determination based upon the first condition of the RUN-task selection condition. Each of the first comparison circuits 290 receives ID, PR, and TIM of two tasks and also receives the CID signal from the determination circuit 296.

The first comparison circuit 290a will be described by way of example. The first comparison circuit 290a compares task 0 and task 1 so as to select the suitable of the two on the basis of the RUN task selection condition mentioned above. First determination: the circuit 290a compares the CID signals output from the determination circuit 296a and the determination circuit 296b, respectively. If one of the signals is 1, i.e., if only one of the tasks is in the READY state, the first comparison circuit 29a outputs ID, PR, and TIM of the task. If both of the signals are 0, i.e., if neither of the tasks is in the READY state, the first comparison circuit 290a outputs ID=PR=TIM=NULL. This shows that none of the tasks is selected. If both of the signals are 1, i.e., if both of the tasks are in the READY state, the second determination is performed as described below. Second determination: the circuit 290a compares the PR signal of task 0 and the PR signal of task 1 so as to select the task with the higher task priority order. For example, given that the task priority order of task 0 is 1 and the task priority order of task 1 is 2, the circuit 290a outputs ID, PR, and TIM of task 0. The second determination enables selection of the RUN-task with the highest task priority order as a candidate for RUN-task. If the task priority order of task 0 is the same as that of task 1, the third determination is performed as described below. Third determination: the circuit 290a compares the TIM signal of task 0 and the TIM signal of task 1 so as to select the task with the longer elapsed READY time. If the tasks are associated with the same elapsed READY time, task 0 is selected. Since the determination is made only by comparing the elapsed time, TCB order management such as that based on a task ready list is not necessary.

In this way, a pair of task 0 and task 1, a pair of task 2 and task 3, a pair of task 4 and task 5, and a pair of task 6 and task 7 are subject to comparison according to the RUN task selection condition. Each of the second comparison circuits 292 narrows down the candidates for RUN-task by examining the output from the two 1st comparison circuits 290. The second comparison circuit 292a performs task selection by referring to the outputs of the first comparison circuit 290a and the first comparison circuit 290b. Therefore, the second comparison circuit 292a outputs ID, PR, and TIM of the task that best matches the RUN task selection condition from among task 0 through task 3. The third comparison circuit 294 operates in a similar manner. The third comparison circuit 294 outputs the task ID of one of task 0 through task 7.

According to the method of processing as described above, the RUN task selection condition can be implemented in hardware. A commonly used software RTOS selects a RUN-task by accessing a task ready list. In contrast, the execution selection circuit 232 according to the basic implementation selects a RUN-task by referring to the state data continuously output from the state storage units 220. The process performed by the execution selection circuit 232 is summarized as follows.

<State Transition of a RUN-Task>

The description hereunder assumes that task J is the RUN-task.

A1. The task switching circuit 210 indicates READY in the task state register 258 for task J.

A2. The task switching circuit 210 sets the timer 252 for task J so as to start measuring the elapsed READY time.

This causes task J to make a transition from RUN to READY. As described previously, the process data is saved in the save register 110 for task J. The bus connecting the processing register set 154 and the save registers 110 is capable of transferring process data in parallel so that the processes A1 and A2 can be performed in one clock.

State Transition of a READY-Task

B1. The task switching circuit 210 identifies the RUN-task by referring to the task ID output from the execution selection circuit 232 upon completion of the state transition of task J. The circuit 210 indicates RUN in the task state register 258 for the identified task. Thus, the identified task makes a transition from READY to RUN. The process data for the identified task is loaded from the save registers 110 into the processing register set 154. The bus connecting the save registers 110 and the processing register set 154 is also capable of transferring process data in parallel so that the process of B1 can be performed in one clock.

A software RTOS consumes more CPU clocks in a task switch due, for example, to accesses to a task ready list. In contrast, the task control circuit 200 according to the basic implementation is capable of completing a task switch in a far shorter period of time. Since the state storage units 220 continuously output status data to the execution selection circuit 232, the execution control circuit 232 continuously outputs the task ID of one of the tasks. Selection of a RUN-task is not started after a task switch is initiated. Instead, selection of a RUN-task is performed according to the output from the execution selection circuit 232 occurring concurrently with a task switch. This adds to the speed of a task switch. The description above assumes that there are eight tasks. A larger number of tasks can be addressed by increasing the number of stages of comparison circuits.

Semaphore Process

Figure 13:
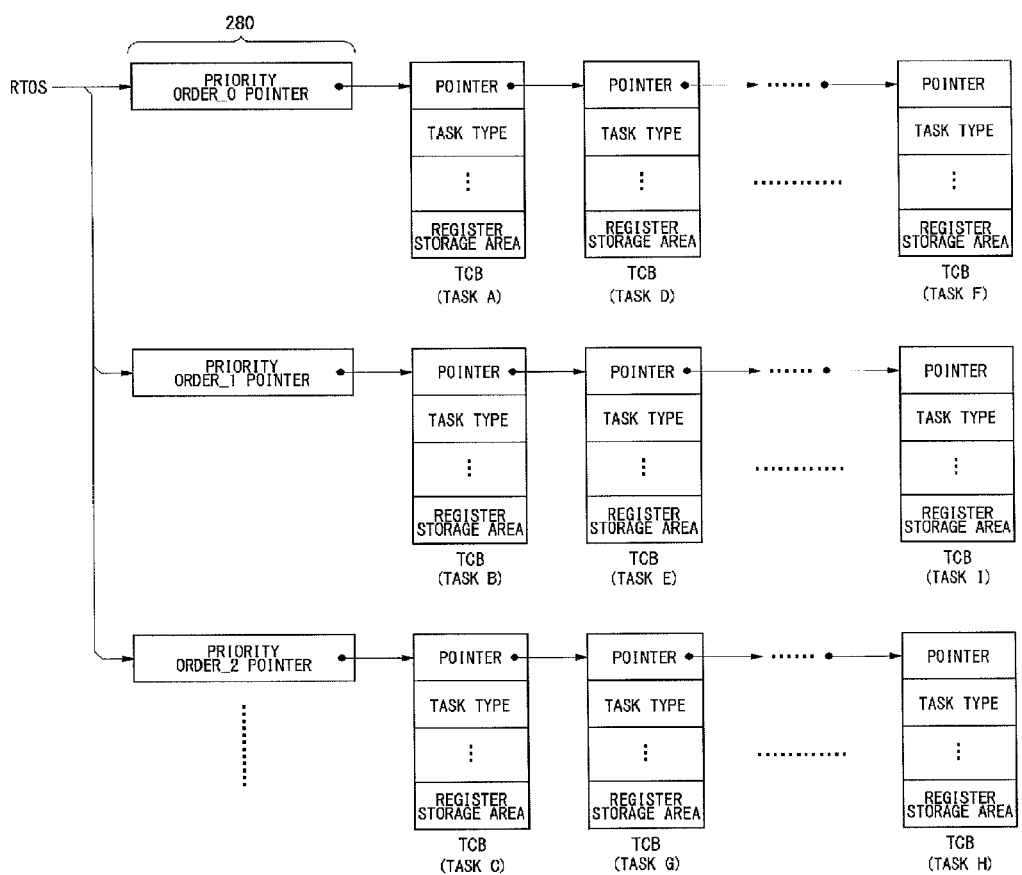
FIG. 13 shows a wait semaphore list used in a semaphore process performed by a commonly used RTOS.

FIG. 13 shows a wait semaphore list used in a semaphore process performed by a commonly used RTOS. A brief description will be given of a semaphore before describing a wait semaphore list. The semaphore table 212 records semaphore IDs and semaphore counters in association with each other. Initially, a finite number is established in a semaphore counter. For example, it will be assumed that a semaphore ID=4 and a semaphore counter=3 are established. When one of the tasks executes a wait semaphore system call designating the semaphore with the semaphore ID=4 as a semaphore to wait for, the task switching circuit 210 decrements the semaphore counter of the semaphore to wait for. The semaphore counter is decremented each time a wait semaphore event call is issued to request acquisition. When the counter reaches 0, the semaphore can no longer be acquired. The task that executes a wait semaphore system call designating a semaphore with the semaphore counter at 0 as a semaphore to wait for makes a transition to the WAIT state.

Meanwhile, when one of the tasks executes a release semaphore system call, designating the semaphore with the semaphore ID=4 as a semaphore to be released, the task switching circuit 210 increments the semaphore counter of the semaphore table 212. When the semaphore counter>0, the task that executes a wait semaphore system call makes a transition from RUN to READY. In this case, the semaphore counter is decremented. When the semaphore counter=0, the task that executes a wait semaphore system call makes a transition from RUN to WAIT. The semaphore counter is not decremented. In order for the task that executes a wait semaphore system call to make a transition from WAIT to READY, another task need execute a release semaphore system call.

[1] Semaphore Process by a Commonly Used Software RTOS

A commonly used software RTOS manages the TCBs of tasks in the WAIT state for the reason that the task waits for a semaphore (hereinafter, referred to as a task in wait for a semaphore) by using a wait semaphore list. The wait semaphore list is a list having the configuration similar to that of the task ready list of FIG. 11 and is formed on the memory. The TCBs for the tasks in wait for a semaphore are connected by pointers. The priority order pointer 280 indicates the start address of the TCB for the task in wait for a semaphore having the associated task priority order. When a release semaphore system call is executed, a commonly used software RTOS scans the wait semaphore list to select a task in wait for a semaphore to be placed from the WAIT state to the READY state. The following processes are performed by the RTOS when executing a wait semaphore system call and when executing a release semaphore system call.

Execution of a Wait Semaphore System Call

The description hereunder assumes that task J is the RUN-task.

A1. The RTOS stores the task ID of the RUN-task in the memory. The RTOS acquires the address of the TCB for task J on the basis of the task ID.

A2. The RTOS detects the semaphore counter of the semaphore to wait for designated in a wait semaphore system call. Hereinafter, the process branches according to the value of the semaphore counter.

(When the Semaphore Counter>0)

A3. The RTOS decrements the semaphore counter of the semaphore to wait for.

A4. The RTOS indicates READY in the TCB for task J.

[0170] In this way, the TCB for task J is added to the task ready list.

(When the Semaphore Counter=0)

A3. The RTOS accesses the TCB to acquire the task priority order of task J. It will be assumed that the task priority order is 0.

A4. The RTOS refers to the wait semaphore list to acquire the priority order pointer associated with the task priority order of task J.

A5. The RTOS detects the TCB indicated by the priority order pointer thus acquired. In this case, the TCB for task A is detected.

A6. The RTOS follows the pointer leading from the TCB for task A so as to detect the TCB at the end of the list. FIG. 13 shows that task F is at the end of the list.

A7: The RTOS configures the pointer from the TCB for task F to address the TCB for task J. In this way, the TCB for task J is added to the wait semaphore list.

A7. The RTOS indicates in the TCB for task J that task J is in the WAIT state. The RTOS also establishes the semaphore ID of the semaphore to wait for.

Execution of a Release Semaphore System Call

B1. The RTOS sequentially follows the tasks with the task priority order 0 so as to identify a task in wait for a semaphore to be released. In the absence of such a task, the RTOS searches for a task with the task priority order 1. The process branches depending on whether a task in wait for a semaphore to be released is identified.

(When the Task is Detected)

The description hereunder assumes that task E is detected as such. The RTOS indicates in the TCB for task E that task E is in the READY state. The RTOS also clears the semaphore ID of the semaphore to wait for.

B3. The RTOS removes task E from the wait semaphore list.

B4. The RTOS causes the task that released the semaphore to make a transition from RUN to READY. The TCB for the task is added to the task ready list.

(When the Task is not Detected)

B2. The RTOS increments the semaphore counter.

B3. The RTOS causes the task that released the semaphore to make a transition from RUN to READY. The TCB for the task is added to the task ready list.

A commonly used software RTOS performs a semaphore-related process by managing a wait semaphore list as described above. The following policies are observed when the RTOS selects a READY-task from among a plurality of WAIT-tasks in releasing a semaphore.

1. The task selected should be a WAIT-task (first condition).

2. The task selected should be a WAIT-task in wait for a semaphore to be released (second condition).

3. If there are a plurality of such tasks, the task selected should have the highest priority order (third condition).

4. If there are a plurality of tasks assigned the highest task priority order, the task selected should have the oldest history of going into the WAIT state (fourth condition).

These four conditions will be collectively referred to as a semaphore wait cancellation condition. The semaphore-based selection circuit 234 of the task processor 100 implements the RTOS's task scheduling function as described above in hardware.

Figure 14:
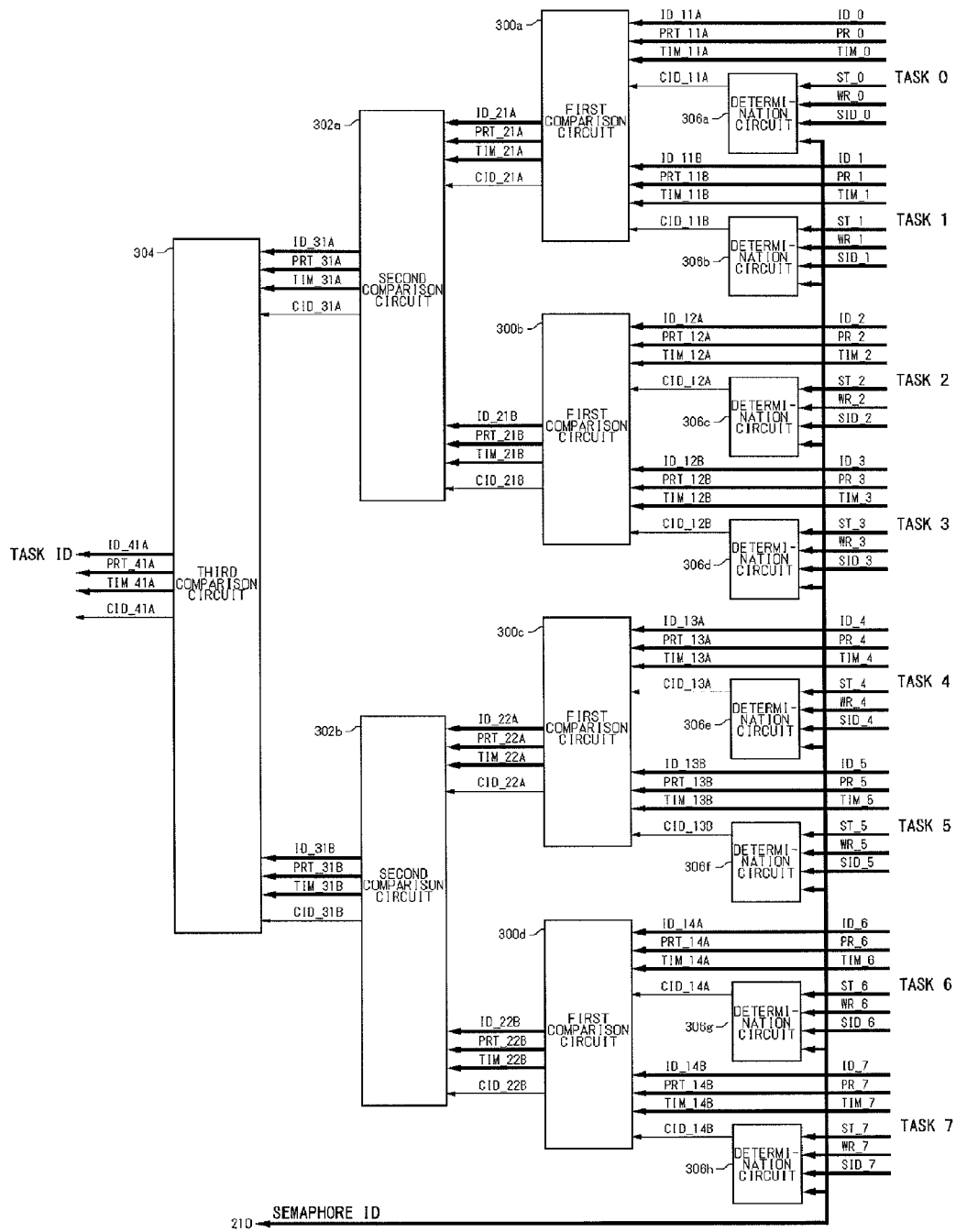
FIG. 14 is a circuit diagram of the semaphore-based selection circuit.

[2] Semaphore Process by the Hardware RTOS According to the Basic Implementation FIG. 14 is a circuit diagram of the semaphore-based selection circuit 234. As in the semaphore process by a commonly used software RTOS, the description assumes eight tasks, namely task 0 through task 7. The semaphore-based selection circuit 234 includes four 1st comparison circuits 300 (300a-300d), two 2nd comparison circuits 302 (302a, 302b), and a 3rd comparison circuit 304. The circuit 234 also includes eight determination circuits 306 (306a-306h). Each of the determination circuits 306 receives ST, WR, and SID signals from the state storage units 220 and also receives a signal from the task switching circuit 210 indicating a semaphore ID. The semaphore ID received is the semaphore ID of the semaphore to be released. Each of the determination circuits 306 outputs a CID signal at 1 if the associated task is a task in wait for a semaphore to be released. If not, the circuit 306 outputs a CID signal at 0. The determination circuit 306 outputs a result of determination based upon the first and second conditions of the semaphore wait cancellation condition. Each of the first comparison circuits 300 receives ID, PR, and TIM of two tasks and also receives the CID signal from the determination circuit 306.

The first comparison circuit 300 performs a determination based upon the third and fourth conditions of the semaphore wait cancellation condition. The same is true of the second comparison circuits 302 and the third comparison circuit 304. As already made clear above, the second and third conditions of the RUN-task selection condition are identical with the third and fourth conditions of the semaphore wait cancellation condition. The comparison circuits of the execution selection circuit 232 compare state data (PR, TIM) of tasks. Meanwhile, the comparison circuits of the semaphore-based selection circuit 234 also compare state data (PR, TIM) of tasks. Thus, the first comparison circuits 290 of the execution selection circuit 232 and the first comparison circuits 300 of the semaphore-based selection circuit 234 are circuits having the same logic built in. Therefore, the first comparison circuits may be implemented in the same hardware. Each task is subject to determination by the determination circuit 306 on the basis of the first and second conditions, before being subjected to determination by the first comparison circuit 300. Through the steps for determination similar to those performed by the execution selection circuit 232, one of the task IDs is output from the third comparison circuit 304. The following processes are performed when executing a wait semaphore system call and when executing a release semaphore system call.

Execution of a Wait Semaphore System Call

The description hereunder assumes that task J is the RUN-task.

A1. The task switching circuit 210 detects from the semaphore table 212 the semaphore counter of the semaphore designated in a wait semaphore system call. Hereinafter, the process branches according to the value of the semaphore counter.

(When the Semaphore Counter>0)

A2. The task switching circuit 210 decrements the semaphore counter in the semaphore table 212.

A3. The task switching circuit 210 indicates READY in the task state register 258 for task J. The task switching circuit 210 sets the timer 252 for the RUN-task so as to start measuring the elapsed READY time.

(When the Semaphore Counter=0)

A2. The task switching circuit 210 indicates WAIT in the task state register 258 for task J, indicates "in wait for a semaphore" in the wait reason register 262, sets the semaphore ID of the semaphore to wait for in the semaphore ID register 264, and sets the timer 252 so as to start measuring the elapsed WAIT time.

The task that has executed the wait semaphore system call makes a transition from the RUN to READY or WAIT.

Execution of a Release Semaphore System Call

B1. The task switching circuit 210 feeds the semaphore ID of the semaphore to be released to the determination circuits 306. Each determination circuits 306 receiving the semaphore ID determines whether the first and second conditions of the semaphore wait cancellation condition are fulfilled. Thus, the first comparison circuit 300 selects a task on the basis of the third and fourth conditions.

(When One of the Determination Circuits Outputs 1 and the Third Comparison Circuit 304 Outputs One of the Task IDs)

B2. The circuit 210 indicates READY in the task state register 258 for the detected task, clears the wait reason register 262 and the semaphore ID register 264, and causes the timer 252 to start measuring the elapsed READY time.

B3. The circuit 210 indicates READY in the task state register 258 for the task that has executed the system call and starts measuring the elapsed READY time. (When none of the determination circuits 306 outputs 1 and the third comparison circuit 304 does not output any task ID).

B2. The task switching circuit 210 increments the semaphore counter of the semaphore table 212.

B3. The circuit 210 causes the task that has executed the system call to make a transition from RUN to READY.

Since the state storage units 220 continuously output status data to the semaphore-based selection circuit 234, the semaphore-based selection circuit 234 can immediately perform selection when the task switching circuit 210 feeds a semaphore ID to the determination circuit 306.

Mutex Process

Like a semaphore, a mutex is used in synchronizing tasks. A mutex and a semaphore differ in the following respects.

1. An integer equal to or greater than 1 may be established in a semaphore counter. In contrast, a mutex is a special kind of semaphore where the count of the semaphore counter is 1 or 0. When the count of the semaphore counter is 2 or greater, two or more tasks can acquire the same semaphore. However, only one task can acquire a given mutex.

2. The task capable of releasing a semaphore by a release semaphore system call is not necessarily the task that has acquired the semaphore by a wait semaphore system call. In contrast, only the task that has acquired a mutex by a wait mutex system call is capable of releasing the mutex by a release mutex system call.

The following policies are observed when the circuit 210 selects a READY-task from among a plurality of WAIT-tasks in releasing a mutex.

1. The task selected should be a WAIT-task (first condition).

2. The task selected should be a WAIT-task in wait for a mutex to be released (second condition).

3. If there are a plurality of such tasks, the task selected should have the highest priority order (third condition).

4. If there are a plurality of tasks assigned the highest task priority order, the task selected should have the oldest history of going into the WAIT state (fourth condition).

The four conditions will be collectively referred to as a mutex wait cancellation condition.

The following processes are performed by the hardware RTOS according to the basic implementation when executing a wait mutex system call and when executing a release mutex system call. The semaphore table 212 stores a mutex ID and occupation state data indicating whether the mutex is occupied by any task, in association with each other. The occupation state data is 0 when the mutex is not occupied. When the mutex is occupied, the occupation state data is the task ID of the task occupying the mutex.

Execution of a Wait Mutex System Call

The description hereunder assumes that task J is the RUN-task.

A1. The task switching circuit 210 detects whether the mutex designated in a wait mutex system call is occupied. Hereinafter, the process branches according to whether the mutex is occupied.

(When the Mutex is not Occupied)

A2. The task switching circuit 210 records, as occupation state data, the task ID of the task that has executed the system call.

A3. The circuit 210 indicates READY in the task state register 258 for task J. The task switching circuit 210 sets the timer 252 for the RUN-task so as to start measuring the elapsed READY time.

(When the Mutex is Occupied)

A2. The task switching circuit 210 indicates WAIT in the task state register 258 for task J, indicates "in wait for a mutex" in the wait reason register 262, sets the mutex ID of the mutex to wait for in the mutex ID register 265, and sets the timer 252 so as to start measuring the elapsed WAIT time.

Execution of a Release Mutex System Call

B1. The task switching circuit 210 feeds the released semaphore ID to the mutex circuit 240 on the condition that the task that has executed the system call occupies the mutex to be released. The mutex circuit 240 also includes comparison circuits connected in multiple stages as in FIG. 14 and determination circuits for determining whether the first and second conditions of the mutex wait cancellation condition are fulfilled. The determination circuit outputs 1 only when the first and second conditions of the mutex wait condition are both fulfilled with regard to the designated mutex. When a task not occupying the mutex to be released executes a release mutex system call, the task is caused to make a transition from RUN to READY.

(When One of the Determination Circuits Outputs 1 and the Mutex Circuit 240 Outputs One of the Task IDs)

B2. The circuit 210 indicates READY in the task state register 258 for the detected task, clears the wait reason register 262 and the mutex ID register 265, and causes the timer 252 to start measuring the elapsed READY time.

B3. The circuit 210 indicates READY in the task state register 258 for the task that has executed the system call and starts measuring the elapsed READY time.

(When None of the Determination Circuits 306 Outputs 1 and the Mutex Circuit 240 does not Output any Task ID)

B2. The task switching circuit 210 indicates that the mutex is unoccupied in the semaphore table 212.

B3. The circuit 210 causes the task that has executed the system call to make a transition from RUN to READY.

Event Process

A brief description will now be given of event management according to the basic implementation. The event table records an event ID and a flag pattern (hereinafter, referred to as a current flag pattern) in association with each other. A flag pattern is an 8-bit pattern. A set event system call is a system call for updating a current flag pattern, using an event ID and a flag pattern (hereinafter, referred to as a set flag pattern) as parameters. When a set event system call is executed, the current flag pattern of the associated event is updated to a logical sum of the current flag pattern and the set flag pattern. For example, given that the current flag pattern is 00001100 and the set flag pattern is 00000101, the current flag pattern is changed to 00001101. Hereinafter, each flag pattern is defined to comprise bit 0, bit 1 . . . and bit 7 from left to right.

A wait event system call is a system call to wait until the current flag pattern of an event to wait for fulfills a predetermined condition. The wait event system call has an event ID, a flag pattern (hereinafter, referred to as "wait flag pattern"), and a flag condition as parameters. When a wait event system call is executed, a determination is made as to whether the flag condition is fulfilled between the current flag pattern and the wait flag pattern. The flag condition is logical sum (OR) or logical product (AND). When the flag condition is logical product (AND), the WAIT cancellation condition is that, for all bits of 1 in the wait flag pattern, the associated bits in the current flag pattern are 1. When the flag condition is logical sum (OR), the WAIT cancellation condition is that, for at least one of bits of 1 in the wait flag pattern, the associated bits in the current flag pattern are 1. For example, given that the current flag pattern is 00001101, the wait flag pattern is 00000011, and the flag condition is logical sum (OR), bit 6 and bit 7 of the wait flag pattern are 1 and bit 7 of the current flag pattern is 1. In this case, the WAIT cancellation condition designated in the wait event system call is fulfilled. Meanwhile, if the flag condition is logical product, the WAIT cancellation condition is not fulfilled since bit 6 of the current flag pattern is 0.

[1] Event Process Performed by a Commonly Used Software RTOS

The following processes are performed by a commonly used RTOS when executing a wait event system call and when executing a set event system call. In a commonly used RTOS, an event table is maintained on the memory for event management. An event table stores not only an event ID, a current flag pattern but also the task ID of a task in the WAIT state for the reason that the task waits for the associated event (hereinafter, referred to as a task in wait for an event), a wait flag pattern of the task, and a flag condition of the task, in association with each other.

Execution of a Wait Event System Call

A1. The RTOS reads a current flag pattern of the event designated in a system call from the event table.

A2. The RTOS compares the current flag pattern with the wait flag pattern according to the flag condition so as to determine whether the WAIT cancellation condition is fulfilled.

(When the WAIT Cancellation Condition is Fulfilled)

A3. The RTOS causes the task that has executed the system call to make a transition from RUN to READY.

(When the WAIT Cancellation Condition is not Met)

A3. The RTOS records the task ID of the task that has executed the system call in the event table.

A4. The RTOS records the wait flag pattern in the event table.

A5. The RTOS records the flag condition in the event table.

A6. The RTOS causes the task that has executed the system call to make a transition from RUN to WAIT.

Execution of a Set Event System Call

B1. The RTOS reads from the event table the current flag pattern, task ID, the wait flag pattern, and the flag condition associated with the event designated in the system call.

B2. The RTOS records the logical sum of the current flag pattern and the set flag pattern as a new current flag pattern.

(When there are No Tasks in Wait for the Designated Event, or when the Wait Cancellation Condition is not Fulfilled in Reference to the Wait Flag Pattern and the Flag Condition Even if there is a Task in Wait for the Designated Event)

B3. The RTOS causes the task that has executed the system call to make a transition from RUN to READY (When there is a Task in Wait for the Designated Event and the Wait Cancellation Condition is Fulfilled)

B3. The RTOS causes the task formerly in wait for the designated event to make a transition from WAIT to READY B4. The RTOS clears the wait task ID, the wait flag pattern, and the flag condition in the event table.

B5. The RTOS causes the task that has executed the system call to make a transition from RUN to READY. Also, the RTOS selects a RUN-task.

The following policies are observed when the RTOS selects a READY-task from among a plurality of WAIT-tasks when a set event system call is executed.

1. The task selected should be a WAIT-task (first condition).

2. The task selected should be a WAIT-task in wait for an event designated in the system call (second condition).

3. The task selected should be a task for which the WAIT cancellation condition is fulfilled based upon the comparison as to the wait flag pattern, the current flag pattern, and the flag condition (third condition).

These three conditions will be collectively referred to as an event wait cancellation condition.

Event Process Performed by the Hardware RTOS According to the Basic Implementation The following processes are performed by the RTOS when the task processor 100 executes a wait event system call and when it executes a set event system call. The semaphore table 212 built in the task processor 100 stores an event ID and a current flag pattern in association with each other. Information such as a wait task ID and a wait flag pattern is stored in the state storage units 220.

Execution of a Wait Event System Call

A1. The task-switching circuit 210 reads a current flag pattern from the event table 214.

A2. The task switching circuit 210 compares the current flag pattern with the wait flag pattern according to the flag condition so as to determine whether the WAIT cancellation condition is fulfilled.

(When the WAIT Cancellation Condition is Fulfilled)

A3. The circuit 210 indicates READY in the task state register 258 for the task that has executed the system call.

(When the WAIT Cancellation Condition is not Fulfilled)

A3. The task switching circuit 210 indicates WAIT in the task state register 258 for the task that has executed the system call, indicates "in wait for an event" in the wait reason register 262, sets the event ID of the event to wait for in the event ID register 266, sets the wait flag pattern in the wait flag register 268, and sets the flag condition in the flag condition register 270.

Execution of a Set Event System Call

B1. The task switching circuit 210 reads a current flag pattern from the event table 214 and feeds the event ID of the event designated in the system call to the event-based selection circuit 236.

B2. The task switching circuit 210 produces a logical sum of the current flag pattern from the event table 214 and the set flag pattern.

B3. The event-based selection circuit 236 selects a task for which the event wait condition is fulfilled with reference to the event ID thus fed. A plurality of tasks may be selected regardless of the task priority order and the elapsed WAIT time.

(When there is a Task that Fulfills the Event Wait Cancellation Condition)

B4. The circuit 210 indicates READY in the task state register 258 for the task in wait for the event and clears the event ID register 266, the wait flat register 268, and the flag condition register 270.

B5. The circuit 210 causes the task that has executed the system call to make a transition from RUN to READY.

(When there are No Tasks that Fulfill the Event Wait Cancellation Condition)

B4. The circuit 210 causes the task that has executed the system call to make a transition from RUN to READY.

Timeout Process

The task that has made a transition to the WAIT state makes a transition to the READY state when the WAIT cancellation condition is fulfilled. If the fulfillment of the WAIT cancellation condition is thwarted due to some external factor or a bug in an application program, the task is incapable of leaving the WAIT state. In this regard, a timeout value is normally established when a task is caused to makes a transition to the WAIT state. A timeout value is decremented periodically. When the value reaches 0, the task is forced to make a transition from the WAIT state to the READY state even if the WAIT cancellation condition is not fulfilled. In this way, the task is prevented from remaining in the WAIT state for a period of time beyond the timeout value.

[1] Timeout Process Performed by a Commonly Used Software RTOS

In the case of a commonly used software RTOS, a timeout value is established in the TCB for a task in the WAIT state. The timeout value is decremented periodically. The RTOS sends an interrupt to the CPU process periodically so as to check the entire TCBs and detect a WAIT-task for which the timeout value reaches 0. In the event that such a task is detected, the RTOS causes the task to make a transition from WAIT to READY.

[2] Timeout Process Performed by the Hardware RTOS According to the Basic Implementation In the case of the basic implementation, the task switching circuit 210 decrements the timeout value of the timeout counters 274 periodically. Timeout values are established as a parameter in executing systems call related to WAIT. The task switching circuit 210 establishes a timeout value in the timeout counter 274 for the task that has executed the system call.

Since the process of decrementing the timeout value does not require the CPU 150, the task switching circuit 210 is capable of updating the timeout value independent of the task execution process. Therefore, the task control circuit 200 is capable of updating the timeout value autonomously even while the CPU 150 is executing the task. Since the state data is continuously fed to the timeout detecting circuit 238, the timeout detecting circuit 238 is capable of detecting a task for which the timeout count reaches 0 substantially at the same time as the timeout count is updated. The timeout detecting circuit 238 outputs the task ID of the detected task. Upon receiving the task ID from the timeout detecting circuit 238, the task switching circuit 210 acknowledges that a timeout has occurred. The circuit 210 then asserts HC so as to halt the supply of the CPU clock. The task switching circuit 210 causes the WAIT-task for which the timeout has occurred to make a transition to READY and causes the RUN-task to make a transition to READY. The task switching circuit 210 selects a task to be executed next from among the READY-tasks. The task switching circuit 210 restarts the timer 252 for the task for which the timeout has occurred so as to measure the elapsed READY time.

According to the method of processing described above, occurrence of a timeout during the execution of a task, i.e., while the CPU clock is running, is immediately followed by an interrupt to the CPU 150 for a task switch. The task switching circuit 210 is capable of independently updating the timeout value during the execution of a task without depending on the processing power of the CPU 150.

Task Switching Circuit as a Finite State Machine

Figure 15:
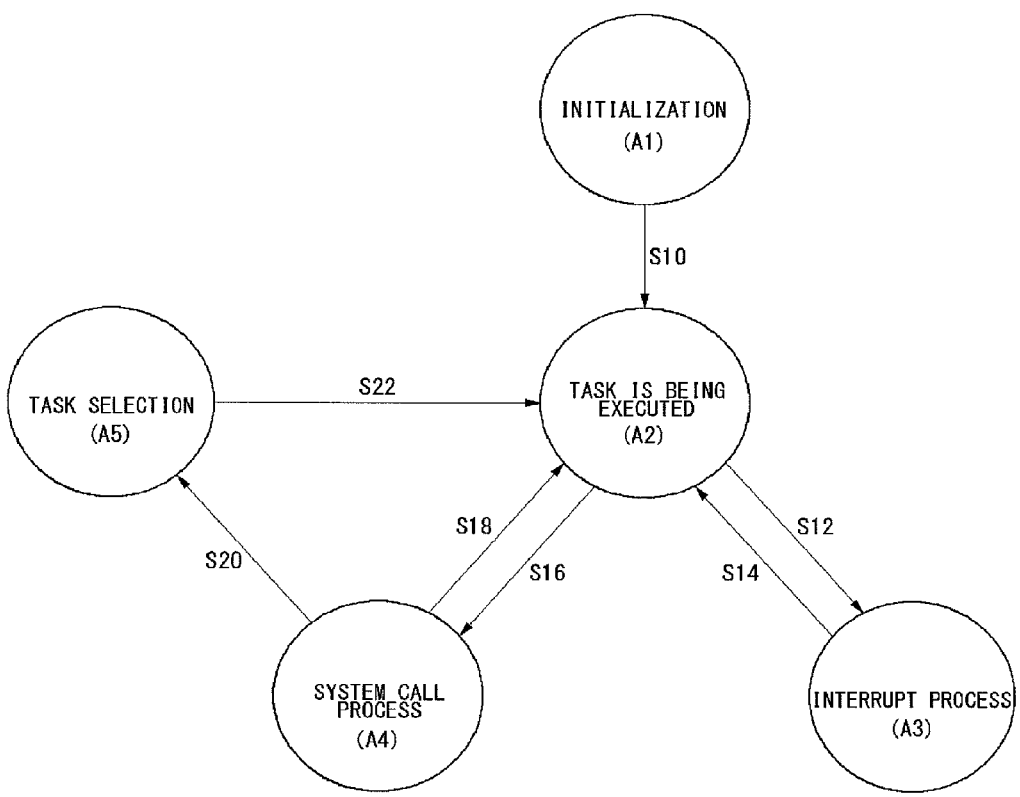
FIG. 15 is a state transition diagram of the task switching circuit according to the basic implementation.

FIG. 15 is a state transition diagram of the task switching circuit 210 according to the basic implementation. Before an initialization process (A1), all tasks are in an IDLE state. When the initialization process is complete (S10), one of the tasks becomes a RUN-task and the circuit 210 is placed in the task execution state (A2). When an interrupt request signal is detected (S12), a special task becomes a RUN-task and an interrupt process (A3) is performed. When the interrupt process is completed (S14), the task switching circuit 210 selects a RUN-task from among the ordinary tasks and makes a transition to A2.

When a system call is executed while a task is being executed (A2) (S16), a system call process is performed (A4). When a task switch, i.e., switching of RUN-tasks, does not occur (S18), the circuit 210 returns to A2. When a task switch occurs as a result of a system call process (A4) (S20), the task switching circuit 210 selects a RUN-task based upon an output from the execution selection circuit 232 (A5). When a task switch is completed (S22), the circuit 210 makes a transition to the state A2. In connection with the basic implementation, an additional description will be given of cases where only one of the save circuit 120 and the task control circuit 200, which are main elements of the task processor 100, is implemented.

Task Processor of a Type not Provided with the Task Control Circuit

Figure 16:
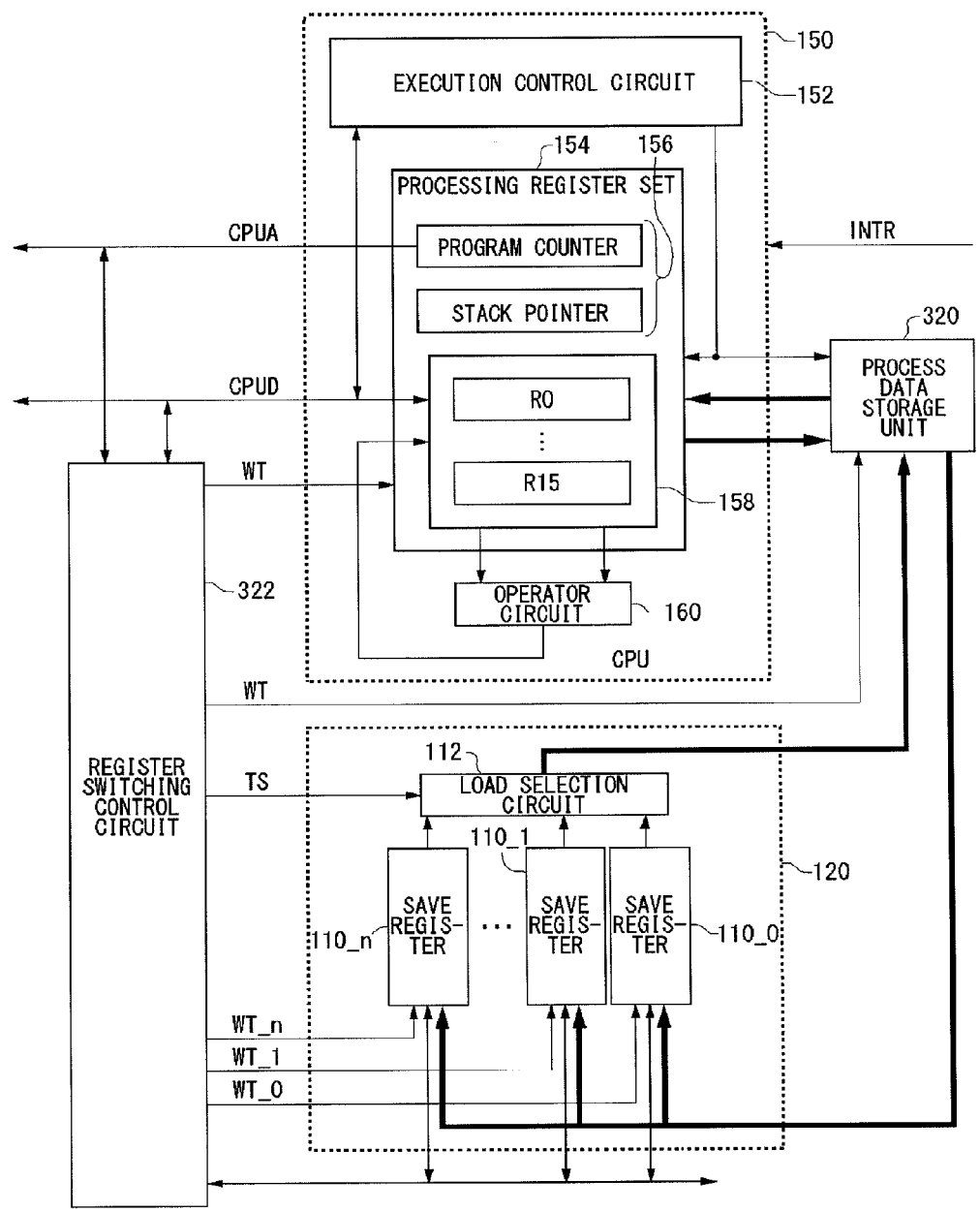
FIG. 16 is a circuit diagram showing a variation to the task processor of FIG. 5 in which the task control circuit is not provided.

FIG. 16 is a circuit diagram showing a variation to the task processor 100 of FIG. 5 in which the task control circuit 200 is not provided. Instead of providing the task control circuit 200, a register switching control circuit 322 and a process data storage unit 320 are added. Since the processor 100 is not provided with the task control circuit 200, the task scheduling function is implemented by the software RTOS. Accordingly, the RTOS needs to acquire the right to use the CPU 150 temporarily for a task switch. Normally, the process data storage unit 320 stores process data for the RTOS. When the RTOS acquires the right to use the CPU 150, the process data storage unit 320 switches between the process data for use by the RTOS stored in the unit 320 and the process data for use by the task stored in the special registers 156. The processing steps involved will be described assuming that task A is switched to task B.

A1. When task A executes a system call, the parameter in a system call and the system call ID are recorded in some of the general-purpose registers 158.

A2. The register switching control circuit 322 moves the process data for task A to the process data storage unit 320 and loads the process data for use by the RTOS in the process data storage unit 320 to the processing register set 154. At this stage, the RTOS acquires the right to use the CPU 150.

A3. The register switching control circuit 322 feeds a write signal to the save register 110a so as to save, in the save registers 110, the process data for use by task A stored in the process data storage unit 320.

A4. The RTOS performs a process responsive to the system call based upon the parameter and ID of the system call recorded in the general-purpose registers 158. Further, the RTOS indicates in the TCB for task A that task A is READY and appends the TCB for task A to the task ready list.

B1. Subsequently, the RTOS selects a RUN-task (in this case, task B) in accordance with the RUN-task selecting condition described above.

B2. The RTOS directs the register switching control circuit 322 to feed a task selection signal designating task B to the load selection circuit 112. This causes the process data to be moved from the save register 110b to the process data storage unit 320.

B3. The register switching control circuit 322 switches between the process data for use by task B in the process data storage unit 320 and the process data for use by the RTOS in the processing register set 154. This allows task B to acquire the right to use the CPU 150.

According to the method of processing described above, the task processor 100 can be made more compact in overall size as compared to the task processor 100 of FIG. 5 provided with the task control circuit 200. The RTOS is implemented in software. However, the loading and saving of process data are subject to hardware control according to signals from the register switching control circuit 322. By defining the number of bits of the bus connecting the processing register set 154, the process data storage unit 320, the load selection circuit 112, and the save registers 110 so as to enable parallel transfer of process data, tasks can be switched faster than by saving process data in TCBs and loading process data from TCBs.

Task Processor of a Type not Provided with the Save Circuit

Figure 17:
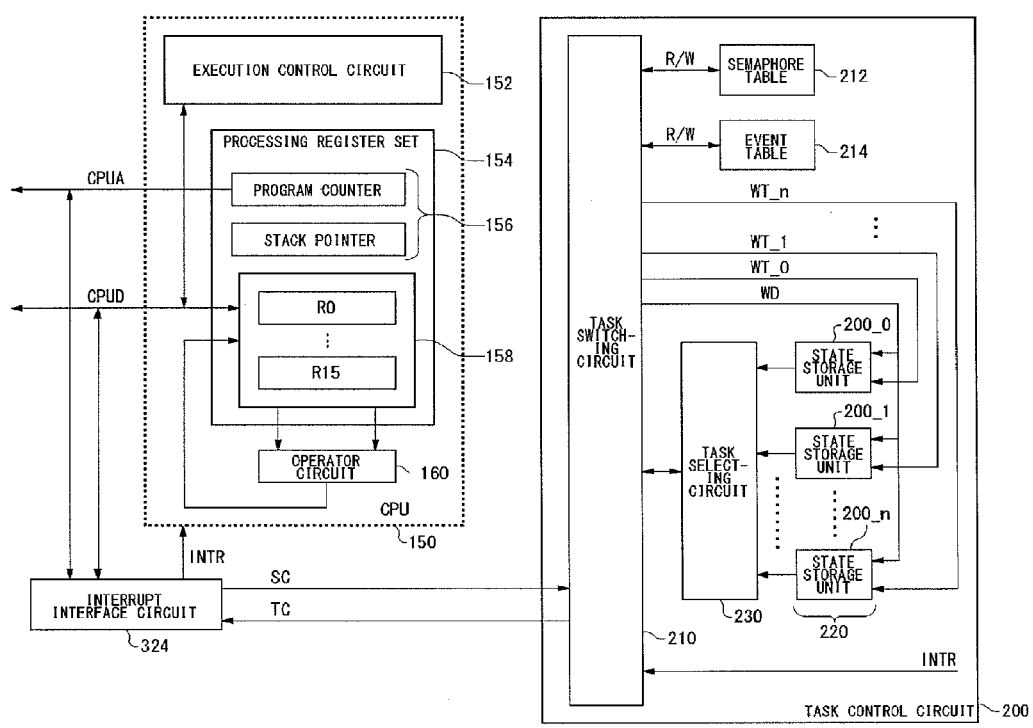
FIG. 17 is a circuit diagram showing a variation to the task processor of FIG. 5 in which the save circuit is not provided.

FIG. 17 is a circuit diagram showing a variation to the task processor 100 of FIG. 5 in which the save circuit 120 is not provided. Instead of providing the save circuit 120, an interrupt interface circuit 324 is added. Since the save circuit 120 is not provided, process data is saved in TCBs in the memory. Saving and loading of process data are achieved by the software-based RTOS. Therefore, the RTOS needs to acquire the right to use the CPU 15 temporarily for a task switch. The processing steps involved will be described assuming that task A is switched to task B.

When a task switch is initiated by a system call, the software RTOS saves the process data for task A in the TCB for task A. The RTOS loads the process data for the RTOS in the processing register set 154. The method of processing is similar to that described with reference to FIG. 3.

The software RTOS writes the parameter of a system call in the interrupt interface circuit 324. The execution control circuit 152 halts the CPU clock of the CPU 150. The interrupt interface circuit 324 causes the task control circuit 200 to perform a task switch. The task switching circuit 210 indicates READY in the task state register 258 for task A and selects task B as the next RUN-task in accordance with an output from the task selecting circuit 230. The task switching circuit 210 directs the interrupt interface circuit 324 to load the process data for task B. At this point of time, the interrupt interface circuit 324 causes the execution control circuit 152 to resume the CPU clock. The interrupt interface circuit 324 notifies the software RTOS that task B is selected. The software RTOS accesses the TCB for task B so as to load the process data for task B into the processing register set 154.

According to the method of processing described above, the task processor 100 can be made more compact in overall size as compared to the task processor 100 of FIG. 5 provided with the save circuit 120. A part of the RTOS function is implemented in hardware but the task selection process is implemented by the task control circuit 200.

Unlike the software RTOS described with reference to FIGS. 2 and 3, a part of the RTOS function is implemented in the hardware of the task processor 100 of FIGS. 16 and 17. As described with reference to FIG. 16, provision of the save circuit 120 eliminates the need to access TCBs to save and load process data. This allows the register switching control circuit 322 to save and load process data. Meanwhile, as described with reference to FIG. 17, provision of the task control circuit 200 allows the software RTOS can delegate the task selecting function to the task control circuit 200.

As described with reference to FIG. 5, the task scheduling function of RTOS can be completely built into hardware in the case of the task processor 100 provided with the save circuit 120 and the task control circuit 200. Since there is no need to access TCBs in the memory for a task switch, the speed of a task switch is further increased. Our experiments show that the task processor 100 according to the basic implementation operates at a speed 100 times that of a commonly used software RTOS described with reference to FIG. 3.

A description will now be given of the task processor 100 according to the improved implementation implementing an interrupt process by hardware logic.

Figure 18:
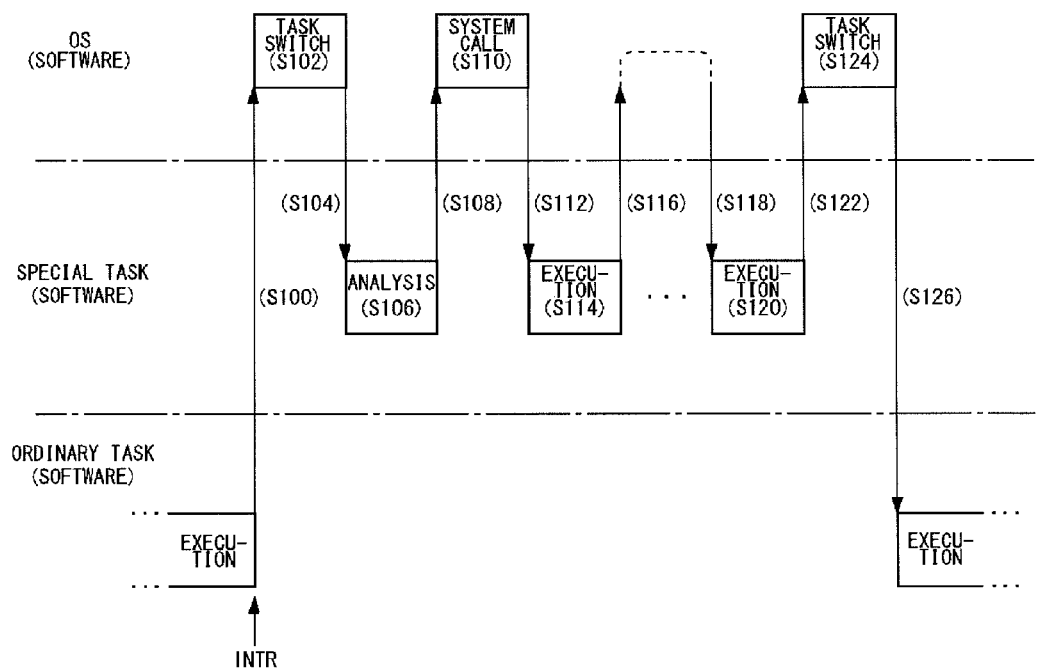
FIG. 18 is a time chart of an interrupt process performed by an ordinary software OS.

FIG. 18 is a time chart of an interrupt process performed by an ordinary software OS. Upon receiving an interrupt request signal from an interrupt controller (not shown), the software OS starts an interrupt handler (i.e., a special task according to the basic implementation). Various events such as depression of a key of the keyboard, reception of a communication packet, completion of DMA transfer, or mere elapse of a predetermined period of time may trigger an interrupt request signal. A special task is a task implemented by software and executes various interrupt processes depending on the factor that causes the interrupt.

Referring to FIG. 18, an interrupt request signal INTR is detected while an ordinary task is being executed. In the case of an interrupt request signal that requires immediate handling, the ordinary task being executed is suspended and the right for execution is transferred to the OS (S100). The OS saves context information of the ordinary task in a TCB (S102) and starts a special task.

The special task analyzes the factor that caused the interrupt (S106). Since an interrupt request signal prompts the execution of various writing operations in an interrupt factor register (not shown), the factor that causes the interrupt is identified by examining the interrupt factor register. The special task determines an interrupt process to be executed in response to the interrupt factor and starts the interrupt process thus determined. During an interrupt process, various system call instructions are executed. For execution of system call instructions, the right for execution is transferred to the OS again (S108). The OS executes designated system calls (S110). When the system calls have been executed, the right for execution is transferred to the special task again (S112). Since an interrupt process is a process given high priority, the right for execution is not normally transferred to an ordinary task unless the execution of a special task is completed.

The special task continues the interrupt process (S114). When a system call instruction is to be executed again, the right for execution is transferred to the OS (S116). As described, the OS and the special task take turns acquiring the right for execution. The last right for execution is transferred to the special task (S118) so that the special task completes the interrupt process (S120). When the interrupt process is completed, the right for execution is transferred to the OS (S122), whereupon a task switch from the special task to the ordinary task is performed (S124). Thus, the normal process by the ordinary task is resumed (S126).

The task processor 100 described in the basic implementation differs from the software OS in that the function of an RTOS is implemented by hardware logic. The basic flow for an interrupt process is, however, substantially the same as that of the software OS. However, as described with reference to the basic implementation, task switch in S102 and S124 and execution of a system call in S110 are performed at a far higher speed than in the case of the software OS. In the case of the task processor 100 according to the basic implementation, processing by the RTOS is executed while the CPU clock is halted in S100, S108, S116, and S122. Processing initiated by a special task or an ordinary task is executed upon restarting the CPU clock (CLK) in S104, S112, S118, and S126. A special task is a task with especially high task priority. Meanwhile, a special task is no different from an ordinary task in that it is a context-based task operated according to the CPU clock (CLK).

In the improved implementation, the speed of an interrupt process is further increased by implementing a part of an interrupt process, and more specifically, a part of the function of a special task by hardware logic.

Details of interrupt processes may vary. Some of interrupt signals require simple and typical processes. For example, a situation is assumed where an ordinary task A starts a DMA transfer and waits for completion of the DMA transfer. Upon starting a DMA transfer, the ordinary task A executes a wait event system call and makes a transition to the WAIT state. When the DMA transfer is completed, an interrupt request signal is fed to the task switching circuit 210 (of the basic implementation). The special task activated thereupon executes a set event system call and records a flag pattern indicating the completion of the DMA transfer in the event table 214. As a result of the change in the current flag pattern in the event table 214, the WAIT cancellation condition of the ordinary task A is fulfilled so that the ordinary task A makes a transition to the READY state. As described, the details of an interrupt process executed in association with the completion of a DMA transfer are relatively simple.

The task processor 100 according to the improved implementation records interrupt request signals requiring relatively simple interrupt processes and occurring, preferably, at a high frequency, as "high-speed interrupt request signals INTR(H)" before they occur. According to the improved implementation, interrupt request signals are categorized into high-speed interrupt request signals INTR(H) and normal interrupt request signals INTR(N).

Figure 19:
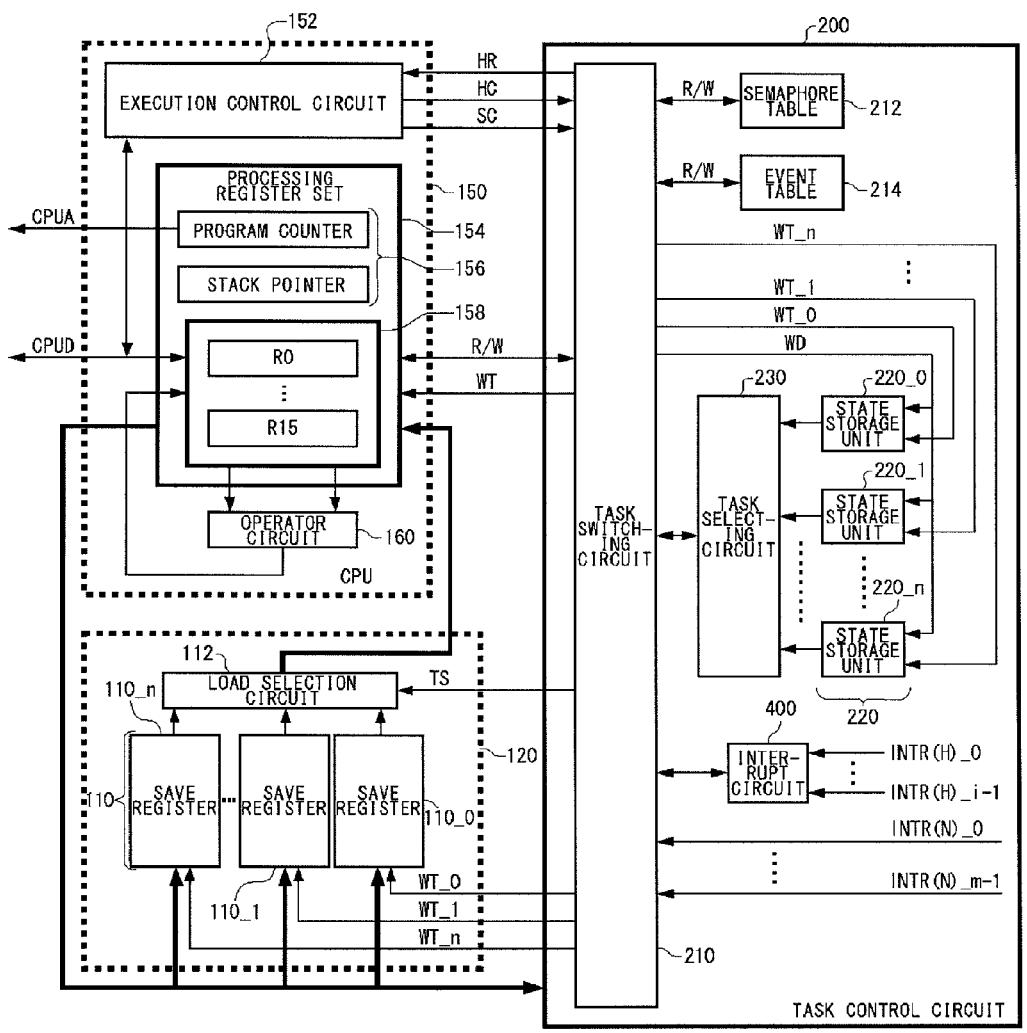
FIG. 19 is a circuit diagram of the task processor according to the improved implementation.

FIG. 19 is a circuit diagram of the task processor 100 according to the improved implementation. The task processor 100 according to the improved implementation also includes the save circuit 120 and the task control circuit 200 in addition to the CPU 150. An interrupt circuit 400 is additionally provided in the task processor 100 according to the improved implementation.

A high-speed interrupt request signal INTR(H) is fed to the interrupt circuit 400. The structure of the interrupt circuit 400 and the method of processing a high-speed interrupt request signal by the interrupt circuit 400. A normal interrupt request signal INTR(N) is directly fed to the task switching circuit 210 as in the basic implementation so that a special task executes an interrupt process. An interrupt process responsive to a high-speed interrupt request signal (hereinafter, referred to as a "high-speed interrupt process") is executed at a higher speed than an interrupt process responsive to a normal interrupt request signal (hereinafter, referred to as a "normal interrupt process"). An advantage of a normal interrupt process is that the details of processing can be flexibly defined by defining a special task run on software. By using a high-speed interrupt request signal and a normal interrupt request signal in combination, the task processor 100 according to the improved implementation achieves high speed while maintaining the general versatility of an RTOS.

Figure 20:
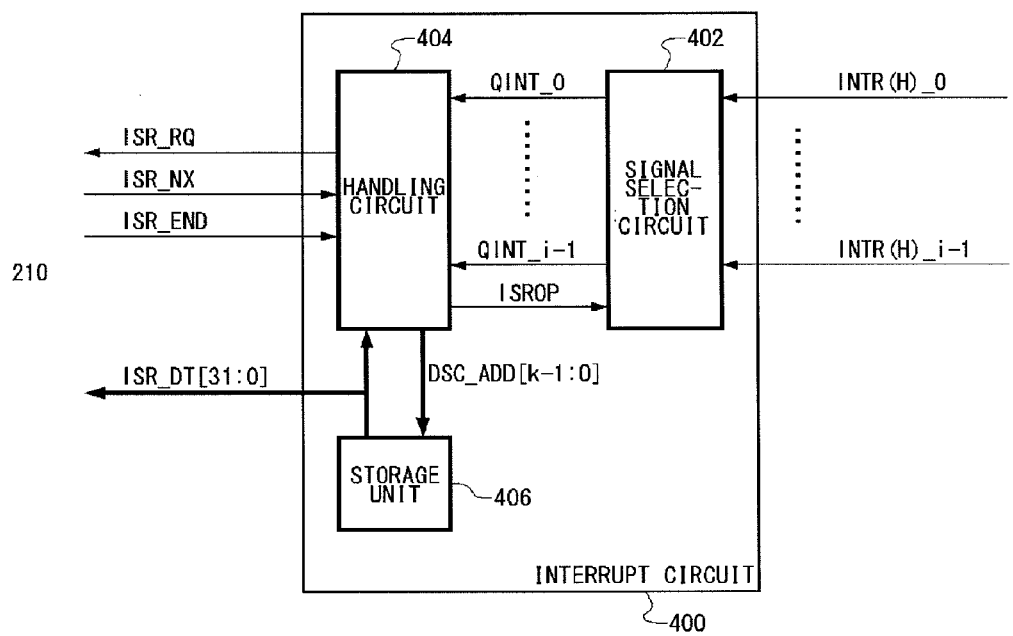
FIG. 20 is a circuit diagram of an interrupt circuit.

FIG. 20 is a circuit diagram of the interrupt circuit 400. The interrupt circuit 400 includes a signal selection circuit 402, a handling circuit 404, and a storage unit 406. A total of i high-speed interrupt request signals INTR(H).sub.-0-INTR(H)_i−1 are fed to the signal selection circuit 402 at irregular intervals. A plurality of high-speed interrupt request signals INTR(H) may be fed in a short period of time. A plurality of high-speed interrupt request signals INTR(H) may be fed simultaneously. The signal selection circuit 402 is capable of storing the received high-speed interrupt request signals INTR(H) temporarily.

Of the high-speed interrupt request signals INTR(H) buffered, the signal selection circuit 402 selects one of the high-speed interrupt request signals INTR(H) according to a predetermined rule for selection. The rule for selection may be defined arbitrarily depending on the design requirement. For example, priority orders may be defined for respective high-speed interrupt request signals INTR(H) so that, when a plurality of high-speed interrupt request signals INTR(H) are buffered, the high-speed interrupt request signal INTR(H)

with the highest priority is selected. Alternatively, the oldest high-speed interrupt request signals INTR(H) fed to the signal selection circuit 402 may be selected or selection may be random. When a high-speed interrupt request signal INTR (H)_n (n is an integer between 0 and i−1) is selected, the signal selection circuit 402 asserts a corresponding signal QINT_n.

When QINT_n is asserted, the handling circuit 404 asserts an ISROP signal. By asserting an ISROP signal, the signal selection circuit 402 is notified that a high-speed interrupt process is being executed. Once an ISROP signal is asserted, the signal selection circuit 402 does not assert QINT subsequently unless the ISROP signal is negated. When an ISROP signal is negated, the signal selection circuit 402 is capable of selecting a high-speed interrupt request signal INTR(H) to be subsequently processed.

When QINT_n is asserted, the handling circuit 404 also asserts ISR_RQ in order to request the task switching circuit 210 to execute a high-speed interrupt process. When ISR_RQ is asserted, the task switching circuit 210 halts the supply of the CPU clock. In this way, the execution of an ordinary task is suspended.

The handling circuit 404 sets a predetermined address ADD[n] in DSC_ADD[k−1:0] in accordance with QINT_n, i.e., in accordance with the selected high-speed interrupt request signal INTR(H)_n. By providing an input DSC_ADD [k−1:0]=ADD[n] to the storage unit 406, an interrupt handling instruction p0 held at the address ADD[n] in the storage unit 406 is transmitted to the task switching circuit 210 as ISR_DT[31:0]. The task switching circuit 210 executes a high-speed interrupt process in accordance with the interrupt handling instruction p0 thus received.

As described with reference to FIG. 22, an interrupt handling instruction according to the embodiment is normalized to the size of 32 bits. The highest bit ISR_DT[31] designates whether there are any interrupt handling instructions to follow. An interrupt handling instruction may be normalized to a size other than 32 bits, including, for example, 64 bits, 128 bits. When the highest bit is such that ISR_DT[1]=1, the task switching circuit 210 asserts ISR_NX and requests the handling circuit 404 to provide a subsequent interrupt handling instruction p1. The handling circuit 404 sets an address ADD [n]+1, obtained by adding one word (in the case of this embodiment, 32 bits) to the previous address ADD[n], in DSC_ADD[k−1:0]. The interrupt handling instruction p1 held at the address ADD[n]+1 is transmitted to the task switching circuit 210 as ISR_DT[31:0]. The task switching circuit 210 executes a high-speed interrupt process in accordance with the interrupt handling instruction p1 thus received.

When the highest bit is such that ISR_DT[31]=0, the task switching circuit 210 asserts ISR_END and notifies the handling circuit 404 of the completion of the high-speed interrupt process. The handling circuit 404 negates ISROP. When ISROP is negated, the signal selection circuit 402 selects another high-speed interrupt request signal INTR(H) and is enabled to assert QINT again. In the improved implementation, the signal selection circuit 402 is controlled by feeding an ISR_END signal to the handling circuit 404 and allowing the handling circuit 404 to negate ISROP. Alternatively, the task switching circuit 210 may directly transmit an ISR_END signal to the signal selection circuit 402 when a high-speed interrupt process is completed so as to control the signal selection circuit 402 accordingly.

Figure 21:
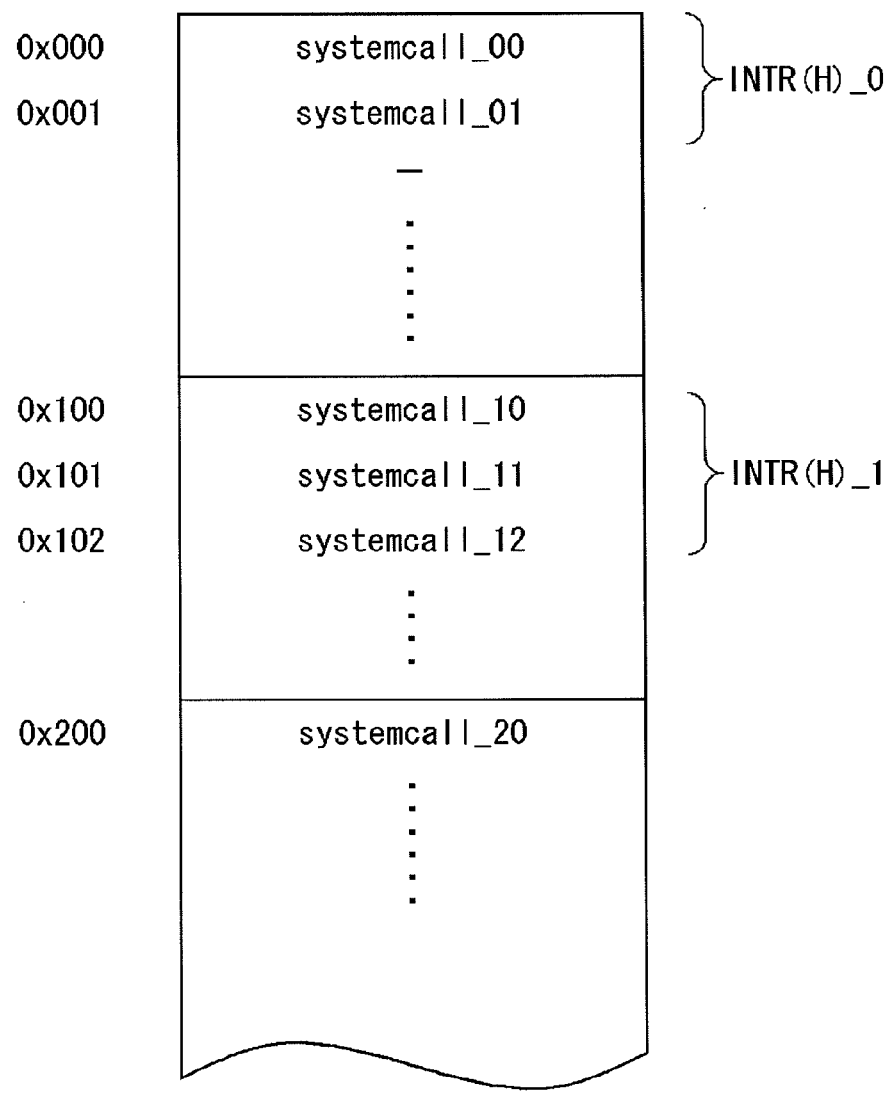
FIG. 21 shows the data structure in a storage unit.

FIG. 21 shows the data structure in the storage unit 406.

The storage unit 406 according to the improved implementation is a memory. Addresses "0.times.000-0.times.0FF" hold a group of interrupt handling instructions corresponding to a high-speed interrupt request signal INTR(H).sub.-0. Similarly, addresses "0.times.100-0.times.1FF" hold a group of interrupt handling instructions corresponding to a high-speed interrupt request signal INTR(H).sub.-1. An interrupt handling instruction according to the improved implementation is a system call instruction. For example, when the signal selection circuit 402 selects the high-speed interrupt request signal INTR(H).sub.-0, the handling circuit 404 designates the first address "0.times.000" for the high-speed interrupt request signal INTR(H).sub.-0 in DSC_ADD[k−1:0]. The storage unit 406 transmits an associated interrupt handling instruction "systemcall.sub.-00" to the task switching circuit 210. Since an interrupt handling instruction "systemcall.sub.-01" follows the interrupt handling instruction "systemcall.sub.-00", "1" is set in the highest bit of the interrupt handling instruction "systemcall.sub.-00". After executing the interrupt handling instruction "systemcall.sub.-00", the task switching circuit 210 asserts ISR_NX in order to request the following interrupt handling instruction.

The handling circuit 404 sets an address "0.times.001", obtained by adding one word to "0.times.000", in DSC_ADD [k−1:0]. The storage unit 406 transmits the subsequent interrupt handling instruction "systemcall.sub.-01" to the task switching circuit 210. The highest bit of "syscall.sub.-01" is set to "0" so that the task switching circuit 210 can recognize that "syscall.sub.-01" is the last interrupt handling instruction in the high-speed interrupt process for the high-speed interrupt request signal INTR(H).sub.-0. When the task switching circuit 210 completes the execution of the interrupt handling instruction "syscall.sub.-01", the task switching circuit 210 asserts ISR_END to indicate the end of the high-speed interrupt process.

Figure 22:
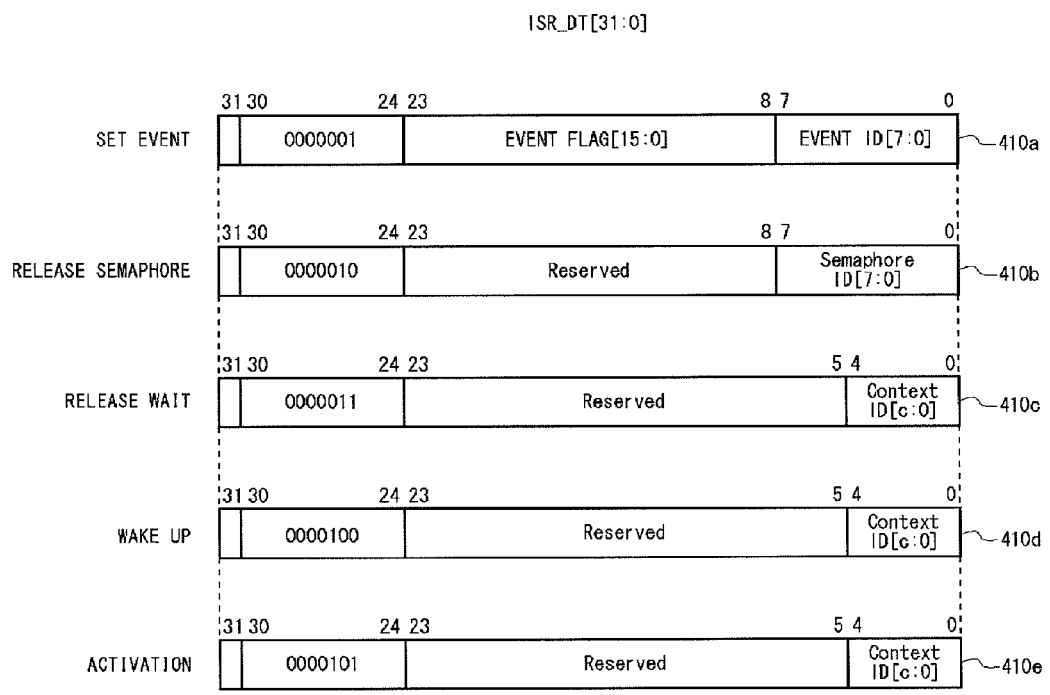
FIG. 22 shows the data structure of an interrupt handling instruction.

FIG. 22 shows the data structure of an interrupt handling instruction. As mentioned above, ISR_DT[31] indicates whether there are any interrupt handling instructions to follow. ISR_DT[30:24] indicates the type of system call. ISR_DT[30:24]=0000001 indicates a "set event system call". An interrupt handling instruction 410 *a* including this pattern is an instruction to execute a set event system call. ISR_DT [23:8] indicates a set flag pattern and ISR_DT[7:0] indicates an event ID. Upon receipt of the interrupt handling instruction 410 *a*, the task switching circuit 210 configures the event table 214 according to the same processing method as used in the basic implementation.

ISR_DT[30:24]=0000010 indicates a "release semaphore system call". An interrupt handling instruction 410 *b* including this pattern is an instruction to execute a release semaphore system call. ISR_DT[7:0] indicates a semaphore ID of a semaphore to be released. ISR_DT[30:24]=0000011 indicates a "release wait system call". An interrupt handling instruction 410 *c* including this pattern is an instruction to execute a release wait system call. ISR_DT[4:0] indicates a task ID to be released from the WAIT state. ISR_DT[30:24]= 0000100 indicates a "wake up task system call". An interrupt handling instruction 410 *d* including this pattern is an instruction to execute a wake up task system call. ISR_DT[4:0] indicates a task ID to be released from the WAIT state. ISR_DT[30:24]=0000101 indicates a "activation system call". An interrupt handling instruction 410*e* including this pattern is an instruction to execute an activation system call. ISR_DT[4:0] indicates a task ID to be activated. Other system calls may be registered in the storage unit 406 as interrupt handling instructions.

The storage unit 406 may be provided as a read only memory (ROM) or a random access memory (RAM). By configuring the storage unit 406 to be rewritable by an application, the details of high-speed interrupt process can be configured by software.

Figure 23:
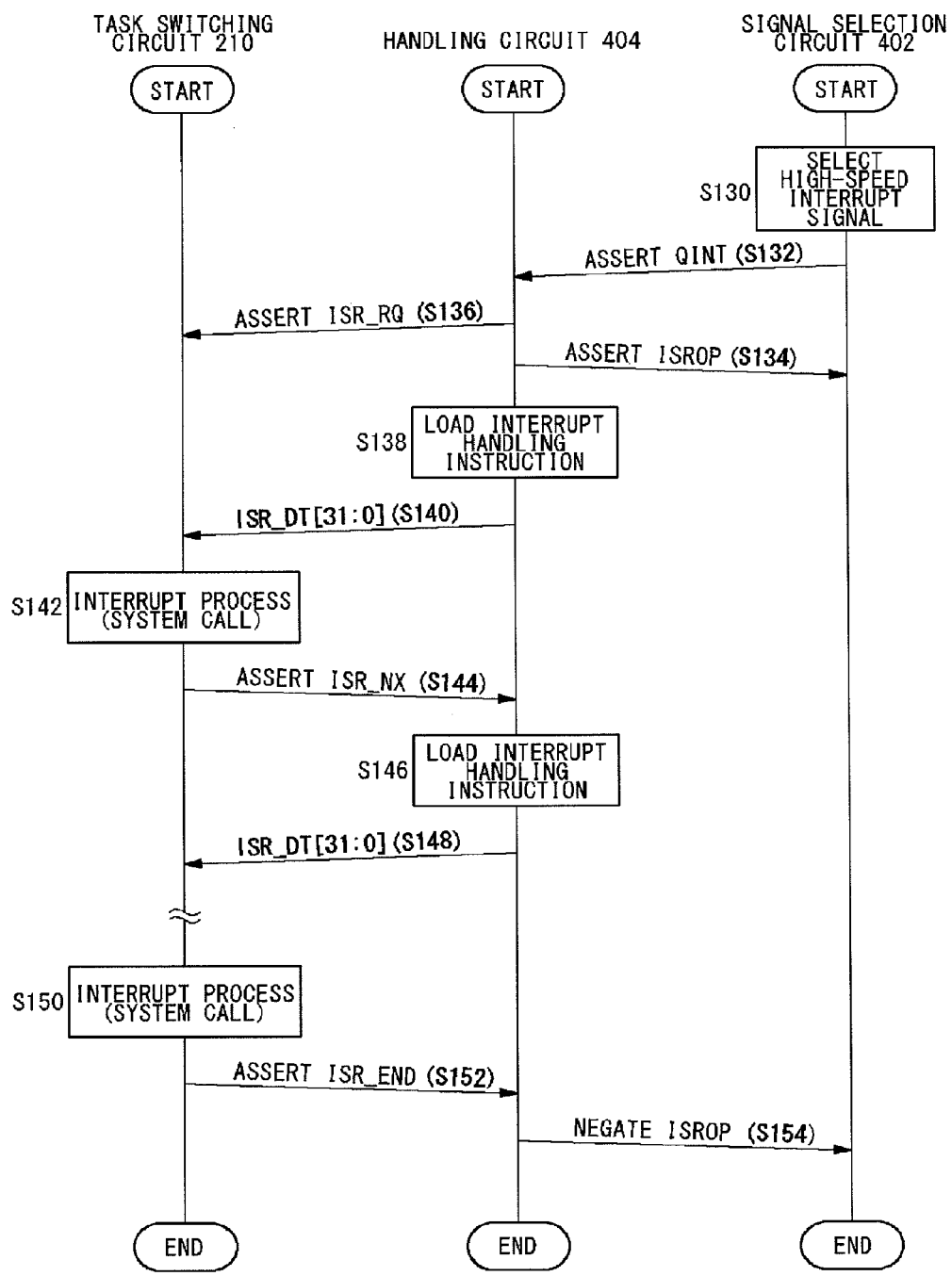
FIG. 23 is a sequence diagram showing the steps of high-speed interrupt process.

FIG. 23 is a sequence diagram showing the steps of high-speed interrupt process. First, the signal selection circuit 402 selects a high-speed interrupt request signal INTR(H)_n to be processed (S130) and asserts QINT_n (S132). The handling circuit 404 asserts ISROP and notifies the signal selection circuit 402 that a high-speed interrupt process is being executed (S134). When ISROP is asserted, the signal selection circuit 402 buffers high-speed interrupt request signals subsequently received and does not assert QINT.

Meanwhile, when QINT_n is asserted, the handling circuit 404 asserts ISR_RQ and requests the task switching circuit 210 to start a high-speed interrupt process (S136). Thereupon, the task switching circuit 210 halts the CPU clock (CLK) and stands by for a high-speed interrupt process. The handling circuit 404 designates the address ADD[n] corresponding to QINT_n in DSC_ADD and reads the interrupt handling instruction p0 from the storage unit 406 (S138). The interrupt handling instruction p0 is transmitted to the task switching circuit 210 as ISR_DT[31:0].

The task switching circuit 210 updates the information in the semaphore table 212, the event table 214, and the state storage units 220 in accordance with the interrupt handling instruction p0 thus received. More specifically, the task switching circuit 210 updates the information in the semaphore table 212, the event table 214, and the state storage units 220 by executing the process performed when an ordinary task issues a release semaphore system call (signaling semaphore system call) or a set event system call (set flag system call). The details of interrupt handling instructions are the same as those of the system call instructions described in the basic implementation. When "1" is set in the highest bit of an interrupt handling instruction, the task switching circuit 210 asserts ISR_NX and requests the handling circuit 404 to provide the subsequent interrupt handling instruction p1 (S144). The handling circuit 404 loads the subsequent interrupt handling instruction p1 (S146) so that the interrupt handling instruction p1 is transmitted to the task switching circuit 210 (S148).

When the task switching circuit 210 has executed the last interrupt handling instruction px, i.e., when the circuit 210 has executed the interrupt handling instruction px in which "0" is set in the highest bit, the task switching circuit 210 asserts ISR_END (S152). The handling circuit 404 recognizes the completion of high-speed interrupt process and negates ISROP (S154). This enables the signal selection circuit 402 to select a subsequent high-speed interrupt request signal.

Figure 24:
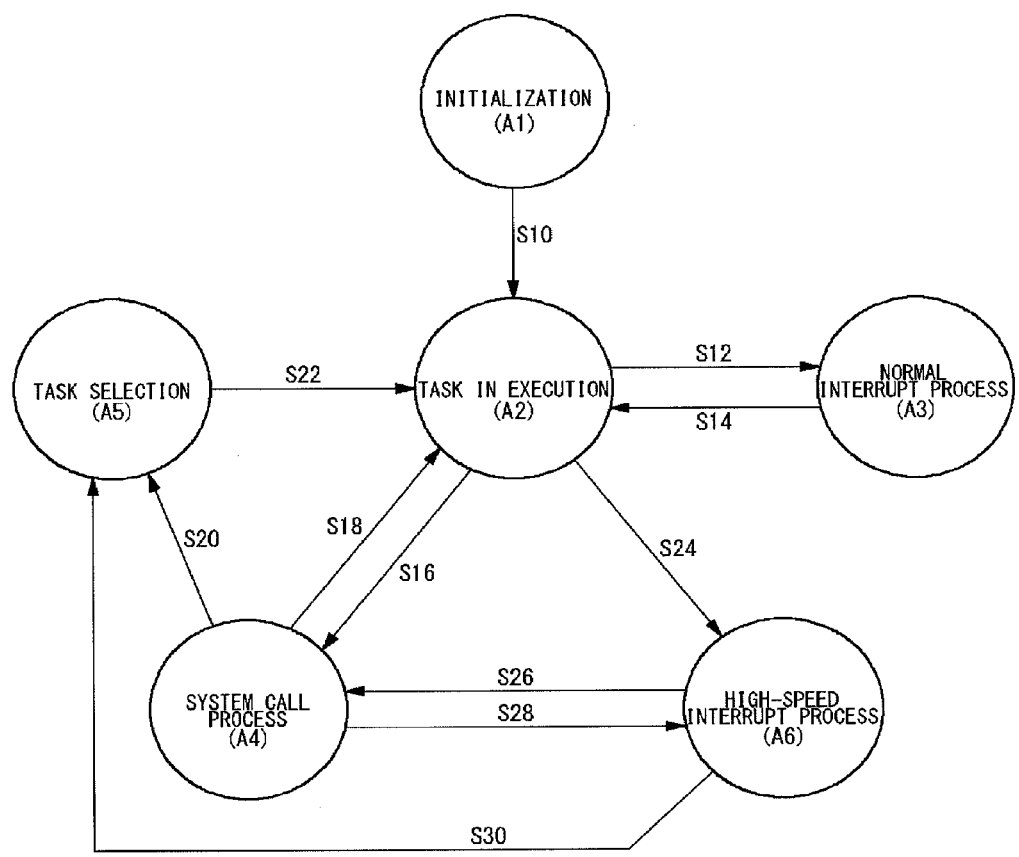
FIG. 24 is a state transition diagram of the task switching circuit according to the improved implementation.

FIG. 24 is a state transition diagram of the task switching circuit 210 according to the improved implementation. In the improved implementation, a high-speed interrupt process (A6) is provided in addition to the states in the state transition diagram shown in FIG. 15. The normal interrupt process (A3) in FIG. 24 is the same as the interrupt process (A3) shown in FIG. 15. Other like numerals represent like details of processing.

When a high-speed interrupt request signal INTR(H) is detected while a task is being executed (A2) (S24), ISR_RQ is asserted and a high-speed interrupt process (A6) is executed. When the interrupt circuit 400 transmits an interrupt handling instruction to the task switching circuit 210 (S26), the task switching circuit 210 executes an associated system call process (A4). When the execution of the system call is completed, a state transition to a high-speed interrupt process (A6) is performed (S28). When there are no more interrupt handling instructions to be processed, the high-speed interrupt process is terminated (S30) and an ordinary task to be subsequently executed is selected (A5).

Figure 25:
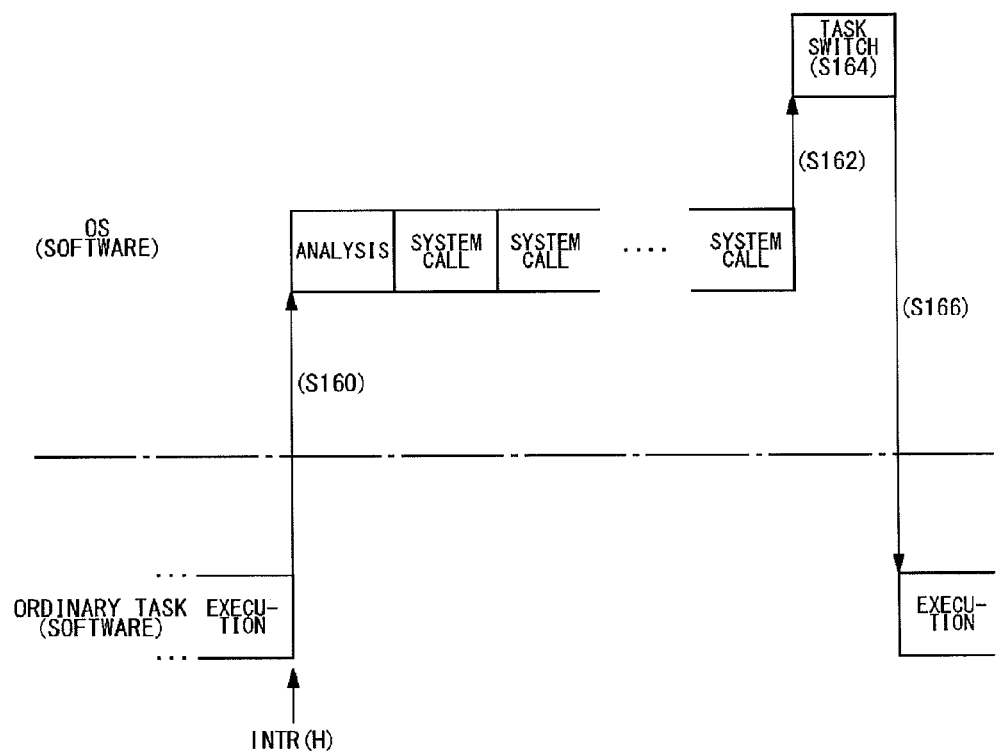
FIG. 25 is a flowchart showing the processing steps in a high-speed interrupt process performed by the task processor according to the improved implementation.

FIG. 25 is a flowchart showing the processing steps in a high-speed interrupt process performed by the task processor 100 according to the improved implementation. Referring to FIG. 25, an interrupt request signal INTR is detected while an ordinary task is being executed. If the signal is an interrupt request signal that need be immediately addressed, the ordinary task being executed is suspended by halting the CPU clock (CLK). A high-speed interrupt process by the interrupt circuit 400 and the task switching circuit 210 is started (S160).

The interrupt circuit 400 reads an interrupt handling instruction as appropriate so that the task switching circuit 210 executes a system call instruction designated as the interrupt handling instruction. When the high-speed interrupt process implemented by a series of system calls is completed (S162), the task switching circuit 210 selects a subsequent RUN-task (S164). When the selection is done, the CPU clock (CLK) is resumed so that the normal process by an ordinary task is resumed.

According to the task processor 100 of the improved implementation, a high-speed interrupt process is implemented in hardware by the coordination of the interrupt circuit 400 and the task switching circuit 210. Our experiments show that the task processor 100 according to the improved implementation operates four times faster than the task processor 100 according to the basic implementation. By forming the storage unit 406 as a rewritable memory, the details of a high-speed interrupt process can be flexibly configured to a certain degree.

Various methods have been attempted to increase the speed of running software including OSs. These attempts are often large-scale or complicated approaches including increase in CPU clocks, increase in memory capacity and register capacity, parallel processing using multiple CPUs, or network distributed processing. In contrast, in the case of the task processor 100 described in the embodiment, the processing efficiency is dramatically improved by adding the save circuit 120, task control circuit 200, etc. to the existing CPU 150. In the case of software OS, ancillary processes such as management of a TCB or task ready list have to be executed in order to implement a task switch sought to be executed primarily. In contrast, the task processor 100 implements task switches, task state management, and interrupt processes by hardware logic so that it does not incur overhead unique to the software approach. For this reason, the task processor 100 provides an ideal system that achieves a high speed, while controlling an increase in power consumption or cost. As indicated in the improved implementation, the speed can be further increased by implementing an algorithm for high-speed interrupt processes by an electronic circuit.

Described above is an explanation of various embodiments of the present invention. These embodiments are intended to be illustrative only and it will be obvious to those skilled in the art that various modifications to constituting elements and processes could be developed and that such modifications are also within the scope of the present invention.

What is claimed is:

1. A task control circuit connected via a signal line to a processor which executes a task, comprising:
   a state register that stores state data representing state of a task; and
   a task switching circuit that controls state of a task, wherein the task switching circuit, when a system call signal is received from the processor, reads out a parameter from an internal register of the processor by itself, performs a system call process based on the parameter, updates the state data, and writes back a return value resulting from the system call process in the internal register by itself.

2. The task control circuit according to claim 1, wherein the task switching circuit, after writing back the return value in the internal register, reactivates the processor suspended after transmitting the system call signal.

3. The task control circuit according to claim 1, wherein the internal register is a general-purpose register embedded in the processor.

4. The task control circuit according to claim 1, wherein the task control circuit is connected to the processor via a plurality of signal lines, and
the task switching circuit performs the system call process corresponding to the signal line which actually transmits the system call signal, among a plurality of system call processes.

5. The task control circuit according to claim 1, further comprising:
a plurality of state registers associated with a plurality of tasks respectively, wherein
the task switching circuit, when a task switching is required, saves context information in the save register associated with the running task.

6. The task control circuit according to claim 1, further comprising:
a task selecting circuit that selects a task based on the state data in accordance with a predetermined condition for selection in a self-directed manner, wherein
the task selecting circuit selects a task to be executed next from among tasks in a READY state indicating that the task is executable and waits for execution, and
the task switching circuit, when a task switching is required, selects the task to be executed next in accordance with an output from the task selecting circuit at the timing of receiving the system call signal.

7. The task control circuit according to claim 1, wherein the task switching circuit, when a task switching is required, halts the supply of a clock for the processor.

8. An auxiliary circuit which is connected to a processor via a signal line and undertakes a part of a processing from the processor, wherein
when the auxiliary circuit receives a system call signal from the processor, the auxiliary circuit reads out a parameter from an internal register of the processor by itself, performs a predetermined process, and writes back a return value resulting from the process in the internal register by itself, and after the return value is written back in the internal register, the auxiliary circuit reactivates the processor suspended after transmitting the system call signal.

9. The auxiliary circuit according to claim 8, wherein the auxiliary circuit is connected to the processor via a plurality of signal lines and performs the process corresponding to a signal line which actually transmits the system call signal, among a plurality of processes.

10. The auxiliary circuit according to claim 8, wherein the auxiliary circuit, when a predetermined interrupt request signal is received from outside, halts the supply of a clock for the processor.

11. The auxiliary circuit according to claim 8, wherein the auxiliary circuit, when the control signal is received from the processor, halts the supply of a clock for the processor.

12. A task processing system, comprising:
a processor which includes a register and performs a main-process; and
an auxiliary circuit which is connected to the processor via a signal line and performs a sub-process, wherein
the processor writes down a parameter in the register and transmits a system call signal to instruct the auxiliary circuit to perform the sub-process,
the auxiliary circuit reads out the parameter from the register by itself, performs the sub-process and writes back a return value resulting from the sub-process in the register and after the return value is written back in the internal register, the auxiliary circuit reactivates the processor suspended after transmitting the system call signal, and
the processor continues the main-process based on the return value after the reactivation.

13. The task processing system according to claim 12, wherein when the auxiliary circuit receives the system call signal from the processor, the auxiliary circuit halts the supply of a clock for the processor, writes back the return value in the register and reactivates the processor.

* * * * *